(12) United States Patent
Choi et al.

(10) Patent No.: US 11,516,483 B2
(45) Date of Patent: Nov. 29, 2022

(54) VIDEO ENCODING METHOD AND DECODING METHOD USING TILES AND SLICES, AND VIDEO ENCODING DEVICE AND DECODING DEVICE USING TILES AND SLICES

(71) Applicant: SAMSUNG ELECTRONICS CO., LTD., Suwon-si (KR)

(72) Inventors: Woongil Choi, Suwon-si (KR); Gahyun Ryu, Suwon-si (KR); Minsoo Park, Suwon-si (KR); Minwoo Park, Suwon-si (KR); Seungsoo Jeong, Suwon-si (KR); Kwangpyo Choi, Suwon-si (KR); Kiho Choi, Suwon-si (KR); Narae Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/299,193

(22) PCT Filed: Dec. 9, 2019

(86) PCT No.: PCT/KR2019/017305
§ 371 (c)(1),
(2) Date: Jun. 2, 2021

(87) PCT Pub. No.: WO2020/117027
PCT Pub. Date: Jun. 11, 2020

(65) Prior Publication Data
US 2022/0078451 A1  Mar. 10, 2022

Related U.S. Application Data

(60) Provisional application No. 62/776,582, filed on Dec. 7, 2018.

(51) Int. Cl.
*H04N 19/174*  (2014.01)
*H04N 19/105*  (2014.01)
(Continued)

(52) U.S. Cl.
CPC ......... *H04N 19/174* (2014.11); *H04N 19/105* (2014.11); *H04N 19/119* (2014.11); *H04N 19/172* (2014.11); *H04N 19/70* (2014.11)

(58) Field of Classification Search
CPC .......................... H04N 19/174; H04N 19/117
See application file for complete search history.

(56) References Cited

U.S. PATENT DOCUMENTS 9,100,662 B2  8/2015  Puri et al.
10,602,136 B2  3/2020  Lee et al.
(Continued)

FOREIGN PATENT DOCUMENTS

KR       10-1535734 B1    7/2015
KR    10-2016-0074485 A   6/2016
(Continued)

OTHER PUBLICATIONS

Communication dated Aug. 30, 2021 issued by the Korean Intellectual Property Office in application No. 10-2021-7003956.
(Continued)

*Primary Examiner* — Jerry T Jean Baptiste
(74) *Attorney, Agent, or Firm* — Sughrue Mion, PLLC

(57) ABSTRACT

Provided is a video decoding method including obtaining identification information of a first tile and identification information of a last tile from a bitstream, wherein the first and last tiles are included in a first slice, determining an index difference between the first tile and the last tile, based on a result of comparing the identification information of the first tile with the identification information of the last tile, determining the number of tiles included in the first slice, by (Continued)

using the index difference between the first tile and the last tile, and decoding a plurality of tiles included in the first slice according to an encoding order by using the number of tiles included in the first slice, the identification information of the first tile, and the identification information of the last tile.

3 Claims, 40 Drawing Sheets

(51) Int. Cl.
*H04N 19/119* (2014.01)
*H04N 19/172* (2014.01)
*H04N 19/70* (2014.01)

(56) References Cited

U.S. PATENT DOCUMENTS

| | | | |
|---|---|---|---|
| 2015/0010056 A1 | 1/2015 | Choi et al. | |
| 2018/0278948 A1 | 9/2018 | Matsuba et al. | |
| 2019/0379894 A1* | 12/2019 | Lim | H04N 19/167 |
| 2020/0275143 A1 | 8/2020 | Denoual et al. | |
| 2021/0168404 A1* | 6/2021 | Lim | H04N 19/513 |

FOREIGN PATENT DOCUMENTS

| | | |
|---|---|---|
| WO | 2013/109114 A1 | 7/2013 |
| WO | 2015/060642 A1 | 4/2015 |

OTHER PUBLICATIONS

Brass, B., et al., "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v5, pp. 1-128 (136 pages).

Communication dated Mar. 17, 2020, issued by the International Searching Authority in counterpart International Application No. PCT/KR2019/017305 (PCT/ISA/220, 210, 237).

Communication dated Apr. 26, 2021, issued by the International Preliminary Examining Authority in counterpart International Application No. PCT/KR2019/017305 (PCT/IPEA/409).

Yasugi et al., "AHG12: Flexible Tile Partitioning," Joint Video Experts Team (JVET) of ITU-T SG 16 WP 3 and ISO/IEC JTC 1/SC 29/WG 11, JVET-K0155-v1, 11th Meeting: Ljubljana, SI, Jul. 10-18, 2018, Total 7 pages.

Communication dated Aug. 10, 2022 by the European Patent Office in counterpart European Patent Application No. 19893852.4.

"Text of ISO/IEC DIS 23008-2:201x High Efficiency Video Coding (4th ed.)", 122. MPEG Meeting, pp. Apr. 16, 2018-Apr. 20, 2018, San Diego, (Motion Picture Expert Group Or ISO/IEC JTC1/SC29/WG11, No. n17661, May 11, 2018, XP030024288. (874 pages total).

Yasugi, Yukinobu et al., "AHG12: Flexible Tile Partioning", Joint Video Experts Team (JVET) of ITU-T 3 SG 16 WP 3 and ISO/IEC JTC 1/SC 29/WG 11, 11th Meeting: Ljubljana, SI, Jul. 10-18, 2018, Document JVET-K0155-V1, XP030198699. (7 pages total).

Deshpande, Sachin, "On Tile Informative Signalling", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0416, XP030252569. (9 pages total).

Choi, Woong Il et al., "AHG12: On tile group configuration", Joint Video Experts Team (JVET) of ITU-T 5. SG 16 WP 3 and ISO/IEC JTC 1/SC 29/WG 11, 13th Meeting: Marrakech, MA, Jan. 9-18, 2019, Document: JVET-M0209, XP030198315. (3 pages total).

\* cited by examiner

FIG. 4
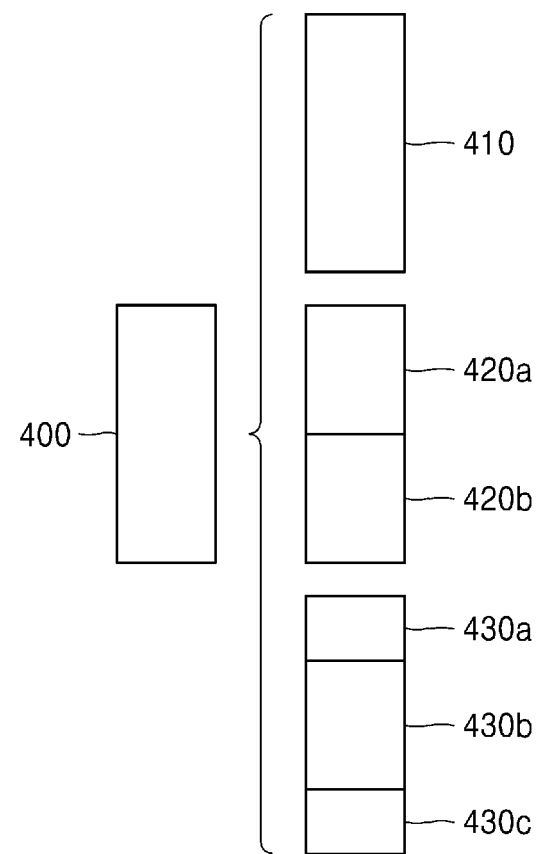
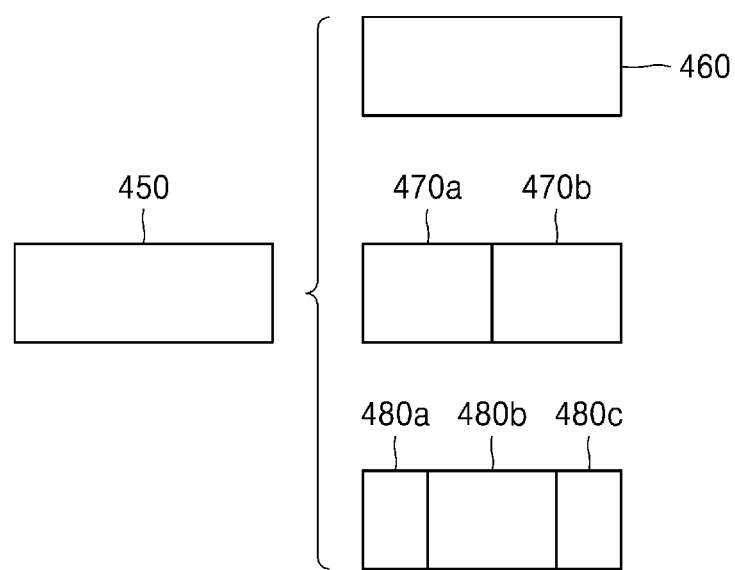

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 31

| SLICE NUMBER | FIRST TILE NUMBER | LAST TILE NUMBER | TILE ORDER |
|---|---|---|---|
| SLICE 0 | 22 | 1 | 22,23,18,19,4,5,0,1 |
| SLICE 1 | 20 | 3 | 20,21,2,3 |
| SLICE 2 | 10 | 13 | 10,11,6,7,16,17,12,13 |
| SLICE 3 | 8 | 15 | 8,9,14,15 |

| 0 | 1 | 2 | 3 |
|---|---|---|---|
| 4 | 5 | 6 | 7 |
| 8 | 9 | 10 | 11 |
| 12 | 13 | 14 | 15 |

FIG. 34

| SLICE LAYOUT A (ROI) | SLICE LAYOUT B (PARALLELISM) |
|---|---|
| SLICE 0: 0, 1, 2, 3 | SLICE 0: 0, 1, 4, 5 |
| SLICE 1: 4, 8 | SLICE 1: 2, 3, 6, 7 |
| SLICE 2: 5, 6, 9, 10 | SLICE 2: 8, 9, 12, 13 |
| SLICE 3: 7, 11 | SLICE 3: 10, 11, 14, 15 |
| SLICE 4: 12, 13, 14, 15 | |

FIG. 36

```
tile_group_data( ) {
    tileIdx = top_left_tile_id
    for( j = 0; j < NumTileRowsInTileGroup; j++, tileIdx += num_tile_columns_minus1 + 1 ) {
        for( i = 0, CurrTileIdx = tileIdx; i < NumTileColumnsInTileGroup; i++, CurrTileIdx++ ) {
            if( CurrTileIdx / NumTileColumnsInTileGroup > tileIdx / NumTileColumnsInTileGroup)
                CurrTileIdx = CurrTileIdx - NumTileColumnsInTileGroup;
            if( CurrTileIdx / NumTileColumnsInTileGroup >= NumTileRowsInTileGroup )
                CurrTileIdx = CurrTileIdx - NumTilesInPic
            ctbAddrInTs = FirstCtbAddrTs[ CurrTileIdx ]
            for( k = 0; k < NumCtusInTile[ CurrTileIdx ]; k++, ctbAddrInTs++ ) {
                CtbAddrInRs = CtbAddrTsToRs[ ctbAddrInTs ]
                coding_tree_unit( )
            }
        }
    }
}
```
3500

FIG. 37

* deltaTileIdx = ( bottom_right_tile_id < top_left_tile_id ) ? bottom_right_tile_id − top_left_tile_id + NumTilesInPic : ( ( top_left_tile_id % ( num_tile_columns_minus1 + 1 ) ) < ( bottom_right_tile_id % ( num_tile_columns_minus1 + 1 ) ) ) ? bottom_right_tile_id − top_left_tile_id + num_tile_columns_minus1 : bottom_right_tile_id − top_left_tile_id

* NumTileRowsInTileGroup = ( deltaTileIdx / ( num_tile_columns_minus1 + 1 ) ) + 1

* NumTileColumnsInTileGroup = ( deltaTileIdx % ( num_tile_columns_minus1 + 1 ) ) + 1

* NumTilesInTileGroup = NumTileRowsInTileGroup * NumTileColumnsInTileGroup

FIG. 39

```
tile_group_header( ) {
   ...
   num_remained_tiles_in_tile_group_minus1
   for( i = 0; i < NumTilesInTileGroup − 1; i++ )
      delta_tile_id_minus1[ i ]
   ...
}
```
— 3900

```
tile_group_data( ) {
   ...
   for( i = 0, CurrTileIdx = tileId[ i ]; i < NumTilesInTileGroup; i++ ) {
      coding_tree_unit( )
   }
}
```
— 3910

FIG. 40

NumTilesInTileGroup = num_remained_tiles_in_tile_group_minus1 + 2 — 4010 tileId[ i ] = ( i > 0 ) ? tileId[ i − 1 ] + delta_tile_id_minus1[ i ] + 1 : top_left_tile_id — 4020

VIDEO ENCODING METHOD AND DECODING METHOD USING TILES AND SLICES, AND VIDEO ENCODING DEVICE AND DECODING DEVICE USING TILES AND SLICES

TECHNICAL FIELD

The disclosure relates to the field of image encoding and decoding. More particularly, the disclosure relates to a method and apparatus for encoding and decoding an image by splitting the image into tiles, tile groups, and slices.

BACKGROUND ART

Data-level parallelism is performing the same operation in parallel by splitting, into several units, data that is to be processed in a parallelization program, and then allocating the split units to different cores or threads. For example, a picture of an input video is split into four slices, and then the four slices are allocated to different cores, and thus, encoding/decoding is performed in parallel. Because a video may be split into data of various units such as a group of pictures (GOP), a frame, a macroblock, a block, other than a slice unit, data-level parallelism may be further embodied into several techniques according to a splitting unit of video data. Among them, parallelization in units of frames, slices, and macroblocks is frequently used in data-level parallelism of video encoders and decoders. Because data-level parallelism performs parallelization after data split so that there is no dependency between split data, there is not much movement of data between cores or threads to which the split data are allocated. In addition, data may be generally split according to the number of cores.

Tiles have been introduced as a parallelization technique in High Efficiency Video Coding (HEVC). Each tile may have only a rectangular shape unlike existing slice split, and may reduce a decrease in encoding performance, compared to a case where a picture is split into the same number of slices as the number of tiles.

DESCRIPTION OF EMBODIMENTS

Technical Problem

According to an embodiment, provided is efficiently encoding and decoding a picture split into slices or tile groups including tiles not connected to each other.

Solution to Problem

According to an embodiment of the disclosure, a video decoding method includes the operation of obtaining identification information of a first tile and identification information of a last tile from a bitstream, wherein the first and last tiles are included in a first slice, the operation of determining an index difference between the first tile and the last tile, based on a result of comparing the identification information of the first tile with the identification information of the last tile, the operation of determining the number of tiles included in the first slice, by using the index difference between the first tile and the last tile, and the operation of decoding a plurality of tiles included in the first slice according to an encoding order by using the number of tiles included in the first slice, the identification information of the first tile, and the identification information of the last tile.

Advantageous Effects of Disclosure

Encoding and decoding methods using tiles and pictures and encoding and decoding apparatuses using tiles and pictures, according to an embodiment, encode and decode a slice or tile group including tiles corresponding to areas not connected to each other, while maintaining independency of data encoding between tiles, and signal information about the tiles included in the slice or tile group.

However, effects achievable by the encoding and decoding methods using tiles and pictures and the encoding and decoding apparatuses using tiles and pictures are not limited to those mentioned above, and other effects that not mentioned could be clearly understood by one of ordinary skill in the art from the following description.

BRIEF DESCRIPTION OF DRAWINGS

A brief description of each drawing is provided to better understanding of the drawings cited herein.

FIG. 4 illustrates a process, performed by an image decoding apparatus, of determining at least one coding unit by splitting a non-square coding unit, according to an embodiment.

FIG. 13 illustrates a process of determining a depth of a coding unit as a shape and size of the coding unit change, when the coding unit is recursively split such that a plurality of coding units are determined, according to an embodiment.

FIG. 31 is a table showing an order of the tiles included in the wrap-around slices of FIG. 30.

FIG. 34 illustrates a layout of the tiles for each slice of FIG. 33.

FIG. 36 illustrates the syntax of tile group data for a tile group, according to an embodiment.

FIG. 37 illustrates a process of obtaining the number of tiles included in a tile group, according to an embodiment.

FIG. 39 illustrates the syntaxes of a tile group header and tile group data for a tile group, according to an embodiment.

FIG. 40 illustrates a process of obtaining the number of tiles included in a tile group, and respective identification numbers of the tiles, according to an embodiment.

BEST MODE

Figure 1:
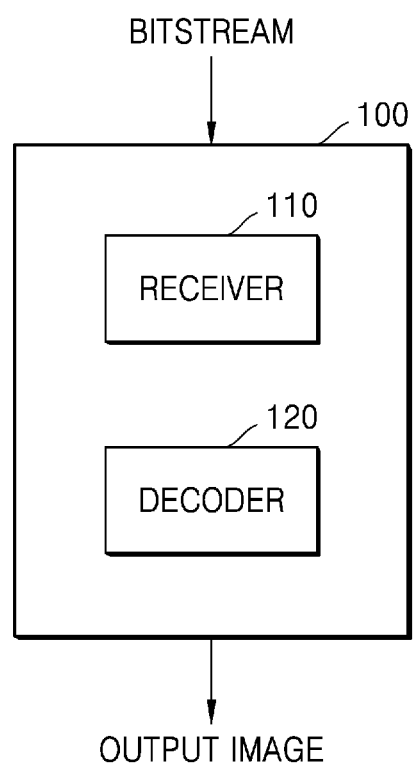
FIG. 1 is a schematic block diagram of an image decoding apparatus according to an embodiment.

According to an embodiment of the disclosure, a video decoding method includes the operation of obtaining identification information of a first tile and identification information of a last tile from a bitstream, wherein the first and last tiles are included in a first slice, the operation of determining an index difference between the first tile and the last tile, based on a result of comparing the identification information of the first tile with the identification information of the last tile, the operation of determining the number of tiles included in the first slice, by using the index difference between the first tile and the last tile, and the operation of decoding a plurality of tiles included in the first slice according to an encoding order by using the number of tiles included in the first slice, the identification information of the first tile, and the identification information of the last tile.

The determining of the index difference between the first tile and the last tile may include, when the identification information of the first tile is greater than the identification information of the last tile, determining, as the index difference between the first tile and the last tile, a value determined by adding the number of tiles included in a picture to a value determined by subtracting the identification information of the first tile from the identification information of the last tile.

The determining of the index difference between the first tile and the last tile may include, when the identification information of the first tile is not greater than the identification information of the last tile and the column number of the first tile is not greater than the column number of the last tile, determining, as the index difference between the first tile and the last tile, a value determined by subtracting the index of the first tile from the index of the last tile.

The determining of the index difference between the first tile and the last tile may include, when the identification information of the first tile is not greater than the identification information of the last tile and a column number of the first tile is greater than a column number of the last tile, determining, as the index difference between the first tile and the last tile, a value determined by adding the number of tile columns included in the picture to a value determined by subtracting the identification information of the first tile from the identification information of the last tile.

The video decoding method may further include, when the picture is split into the plurality of tiles, the picture is split into a plurality of encoding slices that do not overlap each other, and each of the plurality of encoding slices includes one or more tiles from among the plurality of tiles, obtaining encoding slice map information including information about the tiles included in the encoding slices, and decoding slice map information including information about the tiles included in a decoding slice for a display area; and decoding a tile overlapping in the encoding slice and the decoding slice, by using the encoding slice map information and the decoding slice map information.

The decoding of the encoding slice and the decoding slice may include, when a first tile and a second tile from among tiles included in a current decoding slice, based on the decoding slice map information, are both included in a current encoding slice according to the encoding slice map information, decoding the first tile by referring to the second tile; and, when the first tile is included in the current encoding slice and the second tile is not included in the current encoding slice according to the encoding slice map information, setting the second tile in an unpredictable state.

The decoding of the plurality of tiles according to the encoding order may include determining a reference picture list for each of the plurality of tiles; and decoding the current tile from among the plurality of tiles by referring to a tile existing at a certain location allocated to the current tile from a first reference picture included in a reference picture list of the current tile.

The video decoding method may further include determining whether the second slice is a slice of an arbitrary location, based on arbitrary location information of the second slice received from the bitstream; when the second slice is the slice of the arbitrary location, determining identification numbers of tiles present at the arbitrary location included in the second slice; and decoding largest coding units included in the tiles.

The determining of the identification numbers of the tiles present at the arbitrary location included in the second slice may include, when the second slice is the slice of the arbitrary location, obtaining, from the bitstream, information indicating the number of remaining slices except for the first tile in the second slice; determining the number of tiles included in the second slice, based on the information indicating the number of remaining slices; obtaining, from the bitstream, information indicating an identification information difference between a current tile and a tile of just previous identification information for each of the tiles included in the second slice; and determining, as identification information of the current tile, a value determined by adding identification information of the first tile included in the second slice and the information indicating the identification information difference to the just previous identification information.

The picture may be split into one or more tile rows and may be split into one or more tile columns, the tile may be a rectangular area including one or more largest coding units into which the pictures are split, the tile may be included in one or more tile rows and may be included in one or more tile columns, and the decoding of the one or more tiles may include decoding largest coding units included in the one or more tiles.

According to an embodiment of the disclosure, a video decoding apparatus includes a syntax element obtainer configured to obtain identification information of a first tile and identification information of a last tile from a bitstream, wherein the first and last tiles are included in a first slice; and a decoder configured to determine an index difference between the first tile and the last tile, based on a result of comparing the identification information of the first tile with the identification information of the last tile, determine the number of tiles included in the first slice, by using the index difference between the first tile and the last tile, and decode a plurality of tiles included in the first slice according to an encoding order by using the number of tiles included in the first slice.

According to an embodiment of the disclosure, a video encoding method includes, when tiles included in a first slice are discontinuously located within a picture, sequentially encoding the tiles included in the first slice; encoding identification information of a first tile located at an upper left end from among the tiles included in the first slice; and encoding identification information of a last tile located at a lower right end from among the tiles included in the first slice.

When the identification information of the first tile is greater than the identification information of the last tile, a value determined by adding the number of tiles included in the picture to a value determined by subtracting the identification information of the first tile from the identification information of the last tile may be determined as the index difference between the first tile and the last tile.

When the identification information of the first tile is not greater than the identification information of the last tile and a column number of the first tile is not greater than a column number of the last tile, a value determined by subtracting the index of the first tile from the index of the last tile may be determined as the index difference between the first tile and the last tile.

When the identification information of the first tile is not greater than the identification information of the last tile and the column number of the first tile is greater than the column number of the last tile, a value determined by adding the number of tile columns included in the picture to a value determined by subtracting the identification information of the first tile from the identification information of the last tile may be determined as the index difference between the first tile and the last tile.

According to an embodiment of the disclosure, a computer-readable recording medium has recorded thereon a computer program for implementing the video decoding method on a computer.

According to an embodiment of the disclosure, a computer-readable recording medium has recorded thereon a computer program for implementing the video encoding method on a computer.

MODE OF DISCLOSURE

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image of a video or a moving image, i.e., the video itself.

Also, in the present specification, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may denote a block of a largest coding unit, coding unit, prediction unit, or transform unit of a current image to be encoded or decoded.

In the present specification, a motion vector in a list 0 direction may denote a motion vector used to indicate a block in a reference picture included in a list 0, and a motion vector in a list 1 direction may denote a motion vector used to indicate a block in a reference picture included in a list 1. Also, a motion vector in a uni-direction may denote a motion vector used to indicate a block in a reference picture included in a list 0 or list 1, and a motion vector in a bi-direction may denote that the motion vector includes a motion vector in a list 0 direction and a motion vector in a list 1 direction.

An image encoding apparatus and an image decoding apparatus, and an image encoding method and an image decoding method according to embodiments will now be described with reference to FIGS. 1 through 16. A method of determining a data unit of an image, according to an embodiment, will be described with reference to FIGS. 3 through 16, and a video encoding/decoding method in which an inter-prediction method using tiles and tile groups according to an embodiment will be described with reference to FIGS. 17 through 28.

A method and apparatus for adaptive selection based on various shapes of coding units, according to an embodiment of the disclosure, will now be described with reference to FIGS. 1 and 2.

FIG. 1 is a schematic block diagram of an image decoding apparatus 100 according to an embodiment of the disclosure.

The image decoding apparatus 100 may include a receiver 110 and a decoder 120. The receiver 110 and the decoder 120 may include at least one processor. The receiver 110 and the decoder 120 may include a memory storing instructions to be performed by the at least one processor.

The receiver 110 may receive a bitstream. The bitstream includes information of an image encoded by an image encoding apparatus 2200 described later. The bitstream may be transmitted from the image encoding apparatus 2200. The image encoding apparatus 2200 and the image decoding apparatus 100 may be connected by wire or wirelessly, and the receiver 110 may receive the bitstream by wire or wirelessly. The receiver 110 may receive the bitstream from a storage medium, such as an optical medium or a hard disk. The decoder 120 may reconstruct an image, based on information obtained from the received bitstream. The decoder 120 may obtain, from the bitstream, a syntax element for reconstructing the image. The decoder 120 may reconstruct the image, based on the syntax element.

Operations of the image decoding apparatus 100 will be described in detail with reference to FIG. 2.

Figure 2:
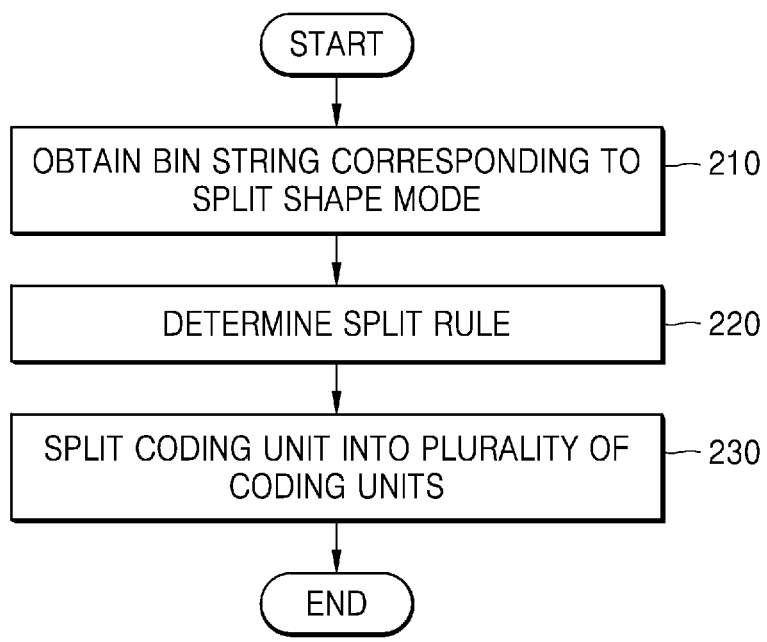
FIG. 2 is a flowchart of an image decoding apparatus according to an embodiment.

FIG. 2 is a flowchart of an image decoding apparatus according to an embodiment of the disclosure.

According to an embodiment of the disclosure, the receiver 110 receives a bitstream.

The image decoding apparatus 100 may perform operation 210 of obtaining, from the bitstream, a bin string corresponding to a split shape mode of a coding unit. The image decoding apparatus 100 performs operation 220 of determining a split rule of the coding unit. The image decoding apparatus 100 performs operation 230 of splitting the coding unit into a plurality of coding units, based on at least one of the bin string corresponding to the split shape mode or the split rule. The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice and one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (where M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, embodiments are not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block splittable into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units, based on split shape mode information obtained from a bitstream. At least one of information indicating whether quad splitting is performed, information indicating whether multi-splitting is performed, split direction information, or split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in a horizontal direction or a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. When split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in more detail with reference to FIGS. 3 through 16.

One or more prediction blocks for prediction may be determined from a coding unit. The prediction block may be the same as or smaller than the coding unit. One or more transform blocks for transform may be determined from a coding unit. The transform block may be the same as or smaller than the coding unit.

The shapes and sizes of the transform block and prediction block may not be related to each other.

According to another embodiment, prediction may be performed by using a coding unit as a prediction unit. Transform may be performed by using a coding unit as a transform block.

The splitting of the coding unit will be described in more detail with reference to FIGS. 3 through 16. A current block and a neighboring block of the disclosure may indicate one of the largest coding unit, the coding unit, the prediction block, and the transform block. The current block of the current coding unit is a block that is currently being decoded or encoded or a block that is currently being split. The neighboring block may be a block reconstructed before the current block. The neighboring block may be adjacent to the current block spatially or temporally. The neighboring block may be located at the lower left, left, upper left, top, upper right, right, or lower right of the current block.

Figure 3:
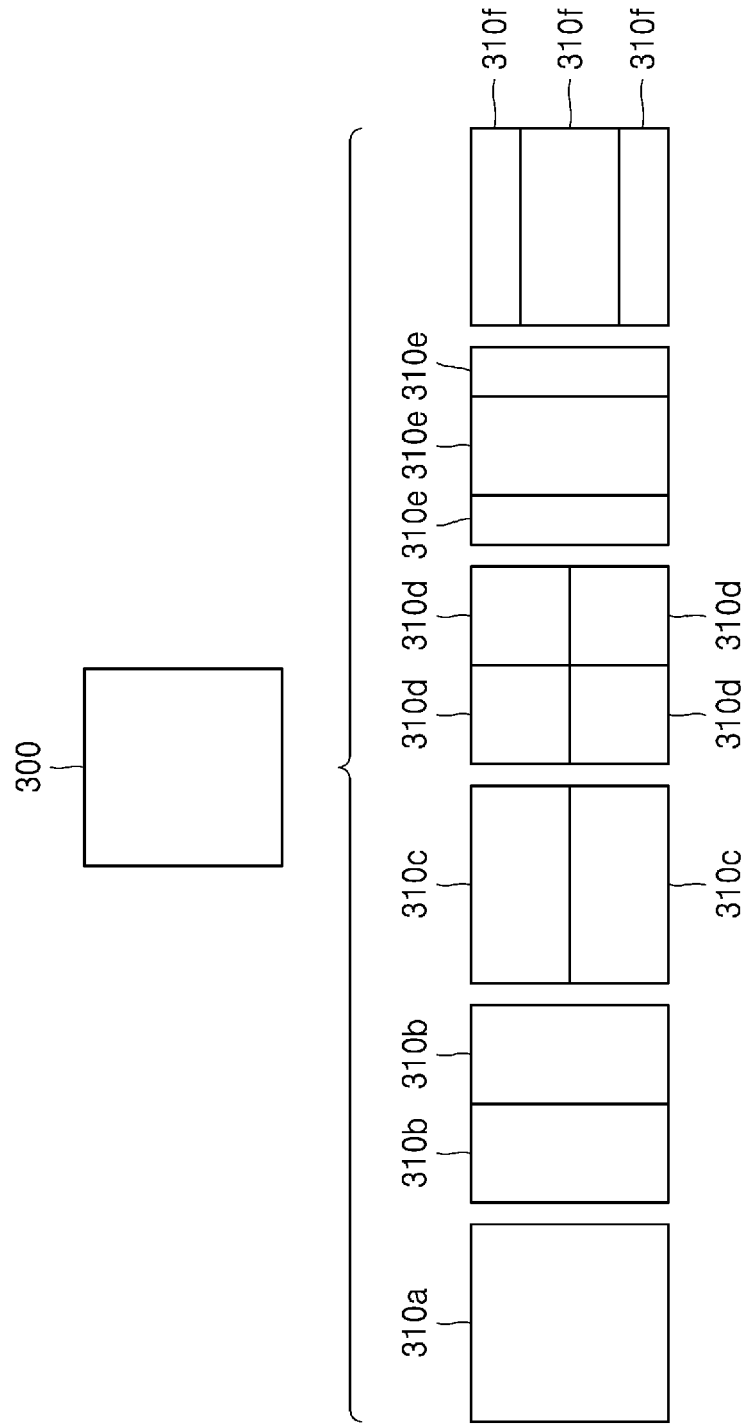
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment of the disclosure.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit to be a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit to be a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, or 32:1. The image decoding apparatus 100 may determine whether the coding unit is in a horizontal direction or a vertical direction, based on the length of the width of the coding unit and the length of the height of the coding unit. The image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, embodiments are not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. The image decoding apparatus 100 may determine split shape mode information regarding the smallest coding unit to be "not to perform splitting". In detail, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. The image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments.

FIG. 4 illustrates a process, performed by an image decoding apparatus, of determining at least one coding unit by splitting a non-square coding unit, according to an embodiment of the disclosure.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or determine coding units 420a and 420b, 430a to 430c, 470a and 470b, or 480a to 480c split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. The image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a* to 430*c* by splitting the current coding unit 400 in the horizontal direction. When the current coding unit 450 is in the horizontal direction, the image decoding apparatus 100 may determine the coding units 480*a* to 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a certain coding unit 430*b* or 480*b* from among the determined odd number of coding units 430*a*, 430*b*, and 430*c*, or 480*a*, 480*b*, and 480*c* may have a size different from the sizes of the other coding units 430*a* and 430*c*, or 480*a* and 480*c*. In other words, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c* or 480*a*, 480*b*, and 480*c* generated by splitting the current coding unit 400 or 450 to be different from that of the other coding units 430*a* and 430*c*, or 480*a* and 480*c*. For example, the image decoding apparatus 100 may restrict the coding unit 430*b* or 480*b* at the center location to be no longer split or to be split only a certain number of times, unlike the other coding units 430*a* and 430*c*, or 480*a* and 480*c*.

Figure 5:
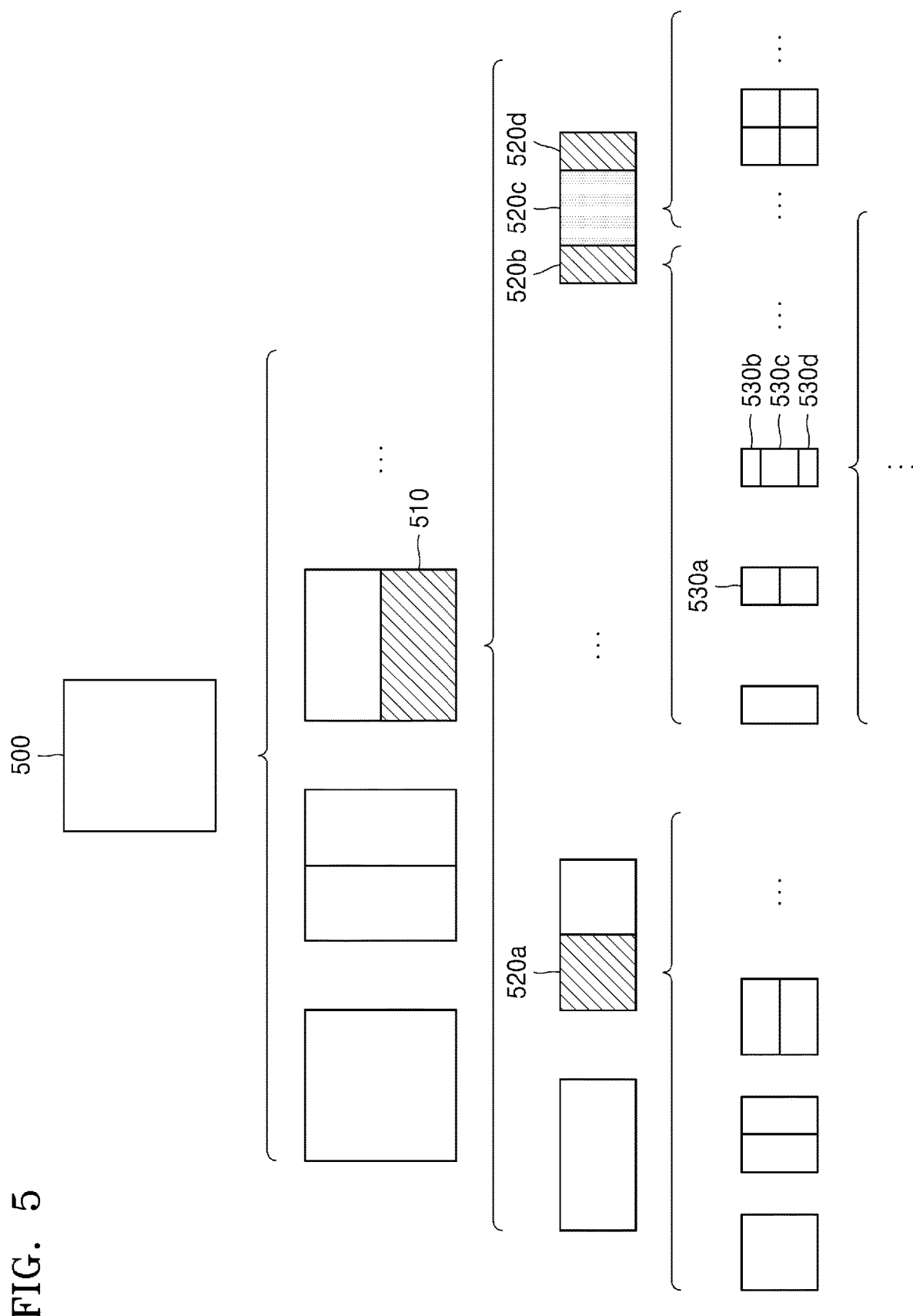
FIG. 5 illustrates a process, performed by an image decoding apparatus, of splitting a coding unit, based on at least one of block shape information or split shape mode information, according to an embodiment.

FIG. 5 illustrates a process, performed by an image decoding apparatus, of splitting a coding unit, based on at least one of block shape information or split shape mode information, according to an embodiment of the disclosure.

According to an embodiment, the image decoding apparatus 100 may determine to split or not to split a first coding unit 500 having a square shape into coding units, based on at least one of the block shape information or the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will now be understood that a relationship between the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520*a*, or 520*b*, 520*c*, and 520*d*, based on the split shape mode information. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520*a*, or 520*b*, 520*c*, and 520*d*, based on the split shape mode information of the second coding unit 510. In other words, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520*b*, 520*c*, and 520*d* determined by splitting the non-square second coding unit 510 (e.g., a coding unit at a center location or a square coding unit) may be recursively split. According to an embodiment, the non-square third coding unit 520*b* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split into a plurality of coding units again. For example, the non-square fourth coding unit 530*b* or 530*d* may be split into the odd number of coding units again. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510, based on the split shape mode information. According to an embodiment, the image decoding apparatus 100 may split the non-square second coding unit 510 into the odd number of third coding units 520*b*, 520*c*, and 520*d*. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a predetermined splitting method (e.g., split into only four coding units or split by using a splitting method of the second coding unit 510), or to be split only a certain number of times (e.g., split only n times (where n>0)). However, the restrictions on the third coding unit 520*c* at the center location are merely simple embodiments and thus are not limited to the above-described embodiments, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a certain location in the current coding unit.

Figure 6:
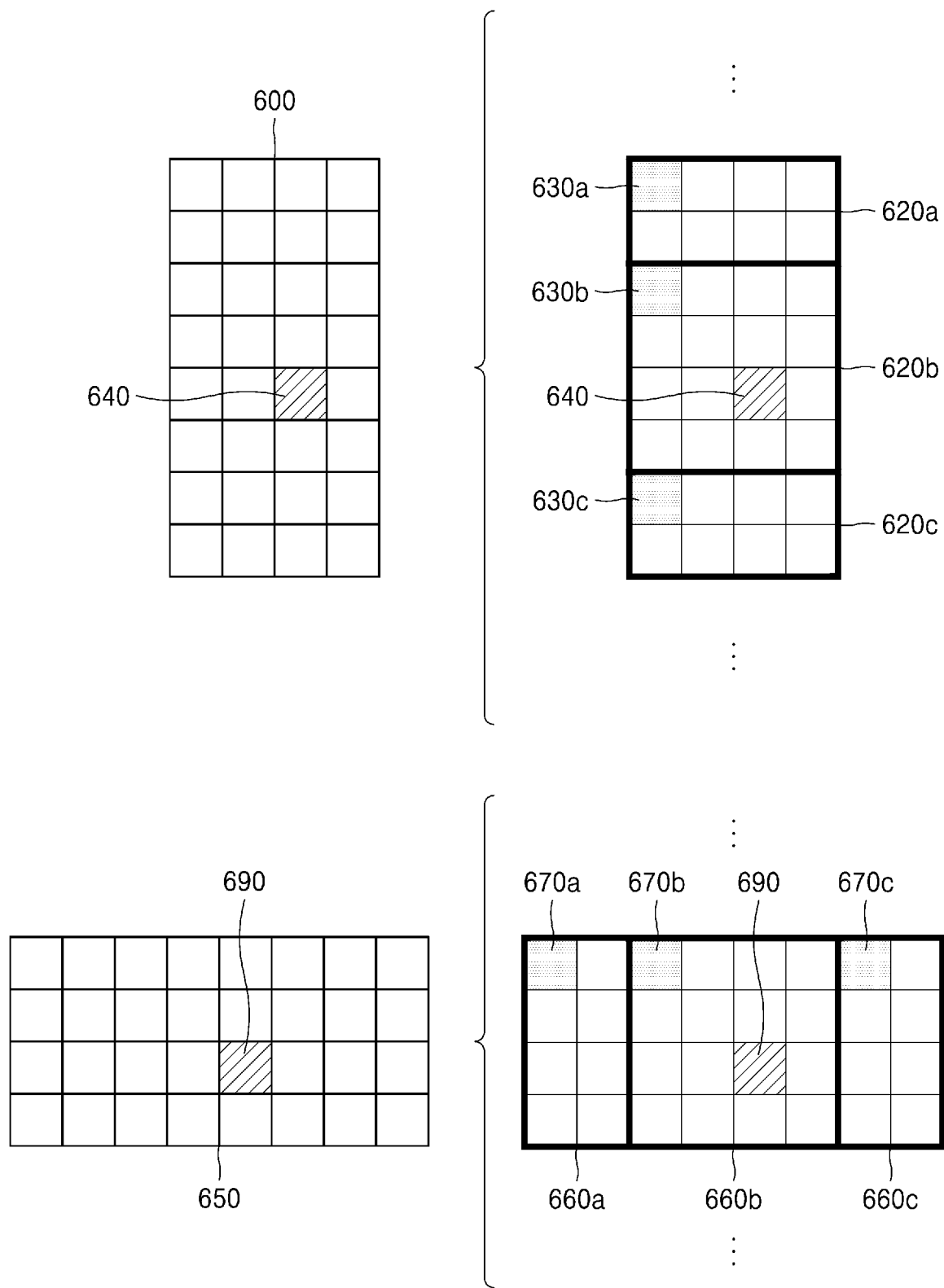
FIG. 6 illustrates a method, performed by an image decoding apparatus, of determining a certain coding unit from among an odd number of coding units, according to an embodiment.

FIG. 6 illustrates a method, performed by an image decoding apparatus, of determining a certain coding unit from among an odd number of coding units, according to an embodiment of the disclosure.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the predetermined location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, the image decoding apparatus 100 may use information indicating respective locations of the odd number of coding units, to determine a coding unit at a center location from among the odd number of coding units. Referring to FIG. 6, the image decoding apparatus 100 may determine an odd number of coding units 620*a*, 620*b*, and 620*c* or an odd number of coding units 660*a*, 660*b*, and 660*c* by splitting the current coding unit 600 or the current coding unit 650, respectively. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* at the center location by determining the respective locations of the coding units 620*a*, 620*b*, and 620*c*, based on information indicating locations of certain samples included in the coding units 620*a*, 620*b*, and 620*c*. In detail, the image decoding apparatus 100 may determine the coding unit 620*b* at the center location by determining the respective locations of the coding units 620*a*, 620*b*, and 620*c*, based on information indicating respective locations of upper left samples 630*a*, 630*b*, and 630*c* of the coding units 620*a*, 620*b*, and 620*c*.

According to an embodiment, the information indicating the respective locations of the upper left samples 630*a*, 630*b*, and 630*c*, which are included in the coding units 620*a*, 620*b*, and 620*c*, respectively, may include information about respective locations or coordinates of the coding units 620*a*, 620*b*, and 620*c* in a picture. According to an embodiment, the information indicating the respective locations of the upper left samples 630*a*, 630*b*, and 630*c*, which are included in the coding units 620*a*, 620*b*, and 620*c*, respectively, may include information indicating respective widths or heights of the coding units 620*a*, 620*b*, and 620*c* included in the current coding unit 600, and the widths or heights may correspond to information indicating differences between the respective coordinates of the coding units 620*a*, 620*b*, and 620*c* in the picture. In other words, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper left sample 630*a* of the upper coding unit 620*a* may include coordinates (xa, ya), information indicating the location of the upper left sample 630*b* of the middle coding unit 620*b* may include coordinates (xb, yb), and information indicating the location of the upper left sample 630*c* of the lower coding unit 620*c* may include coordinates (xc, yc). The image decoding apparatus 100 may determine the middle coding unit 620*b* by using the coordinates of the upper left samples 630*a*, 630*b*, and 630*c* which are included in the coding units 620*a*, 620*b*, and 620*c*, respectively. For example, when the coordinates of the upper left samples 630*a*, 630*b*, and 630*c* are sorted in an ascending or descending order, the coding unit 620*b* including the coordinates (xb, yb) of the sample 630*b* at the center location may be determined as a coding unit at a center location from among the coding units 620*a*, 620*b*, and 620*c* determined by splitting the current coding unit 600. However, the coordinates indicating the locations of the upper left samples 630*a*, 630*b*, and 630*c* may include coordinates indicating absolute locations in the picture, or may use coordinates (dxb, dyb) that is information indicating a relative location of the upper left sample 630*b* of the middle coding unit 620*b* and coordinates (dxc, dyc) that is information indicating a relative location of the upper left sample 630*c* of the lower coding unit 620*c* with reference to the location of the upper left sample 630*a* of the upper coding unit 620*a*. A method of determining a coding unit at a certain location by using coordinates of a sample included in the coding unit, as information indicating a location of the sample, is not limited to the above-described method, and may be any of various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* according to a certain criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper left sample 630*a* of the upper coding unit 620*a*, the coordinates (xb, yb) that is the information indicating the location of the upper left sample 630*b* of the middle coding unit 620*b*, and the coordinates (xc, yc) that is the information indicating the location of the upper left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the respective locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb-ya. According to an embodiment, the image decoding apparatus 100 may determine the width of the middle coding unit 620*b* to be the width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 and the widths or heights of the upper and middle coding units 620*a* and 620*b*. The image decoding apparatus 100 may determine a coding unit having a different size from that of the others, based on the determined widths and heights of the coding units 620*a*, 620*b*, and 620*c*. Referring to FIG. 6, the image decoding apparatus 100 may determine the middle coding unit 620*b*, which has a size different from the size of the upper and lower coding units 620*a* and 620*c*, as the coding unit at the certain location. However, the above-described method, performed by the image decoding apparatus 100, of determining a coding unit having a size different from the size of the other coding units merely corresponds to an example of determining a coding unit at a certain location by using the sizes of coding units, which are determined based on the coordinates of samples, and thus various methods of determining a coding unit at a certain location by comparing the sizes of coding units, which are determined based on coordinates of predetermined samples, may be used.

The image decoding apparatus 100 may determine the width or height of each of the coding units 660*a*, 660*b*, and 660*c* by using the coordinates (xd, yd) that are information indicating the location of a upper left sample 670*a* of the left coding unit 660*a*, the coordinates (xe, ye) that are information indicating the location of an upper left sample 670*b* of the middle coding unit 660*b*, and the coordinates (xf, yf) that are information indicating the location of the upper left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the respective locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 and the widths or heights of the left and middle coding units 660*a* and 660*b*. The image decoding apparatus 100 may determine a coding unit having a different size from that of the others, based on the determined widths and heights of the coding units 660*a*, 660*b*, and 660*c*. Referring to FIG. 6, the image decoding apparatus 100 may determine the middle coding unit 660*b*, which has a size different from the sizes of the left and right coding units 660*a* and 660*c*, as the coding unit at the certain location. However, the above-described method, performed by the image decoding apparatus 100, of determining a coding unit having a size different from the size of the other coding units merely corresponds to an example of determining a coding unit at a certain location by using the sizes of coding units, which are determined based on the coordinates of samples, and thus various methods of determining a coding unit at a certain location by comparing the sizes of coding units, which are determined based on coordinates of predetermined samples, may be used.

However, locations of samples considered to determine locations of coding units are not limited to the above-described upper left locations, and information about locations of arbitrary samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the certain location in a vertical direction. In other words, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information or split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c, based on the split shape mode information, and may determine the coding unit 620b at a center location from among the plurality of coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width or height of the current coding unit in half, as the sample from which the certain information may be obtained, by using at least one of information about the width of the current coding unit or information about the height of the current coding unit. As another example, when the block shape information of the current coding unit indicates a non-square shape, the image decoding apparatus 100 may determine one of samples including a boundary for splitting a long side of the current coding unit in half, as the sample from which the certain information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and split the plurality of coding units generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
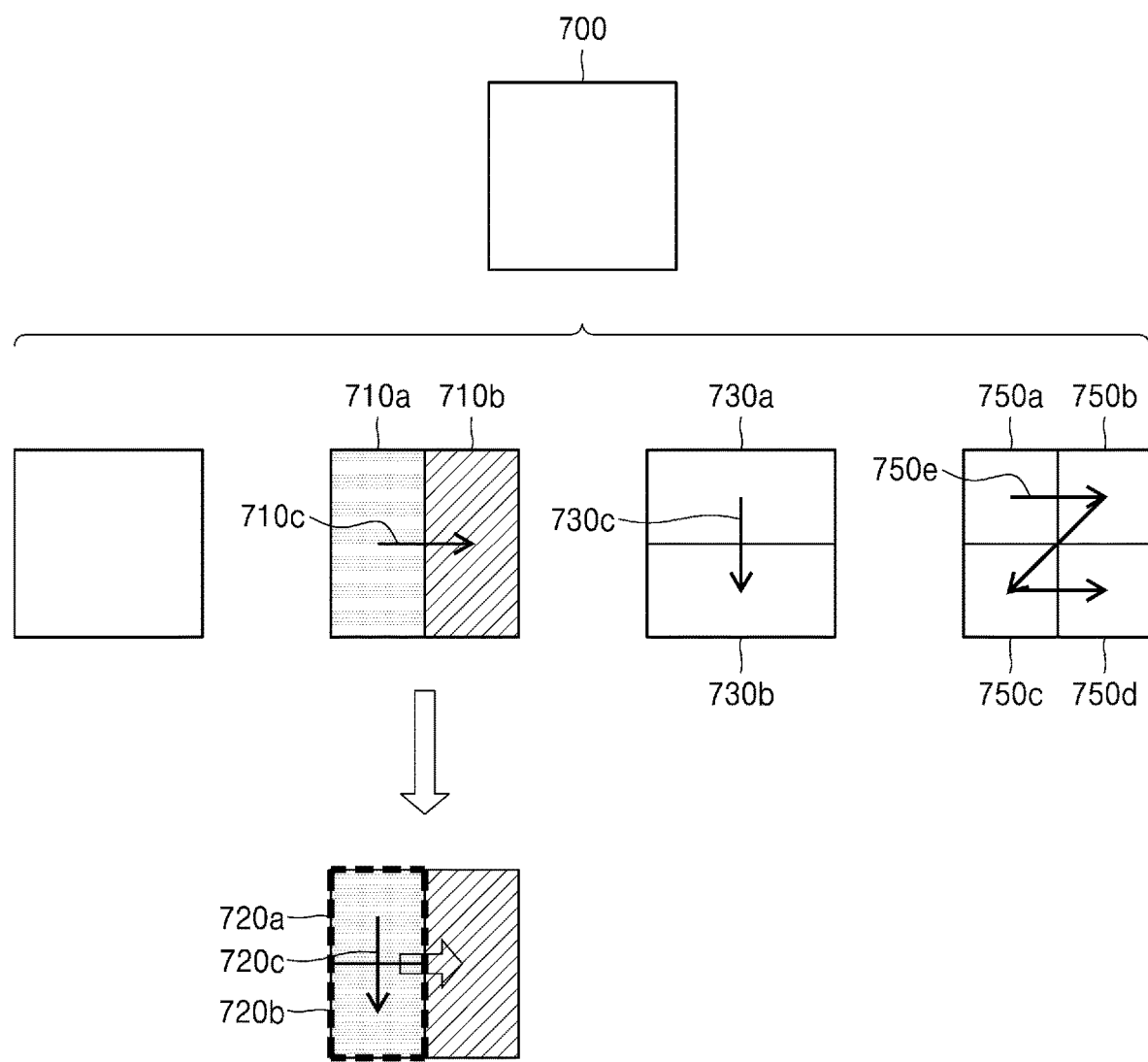
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment of the disclosure.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710*a* and 710*b* determined by splitting the first coding unit 700 in a vertical direction, in a horizontal direction order 710*c*. The image decoding apparatus 100 may determine to process the second coding units 730*a* and 730*b* determined by splitting the first coding unit 700 in a horizontal direction, in a vertical direction order 730*c*. The image decoding apparatus 100 may determine to process the second coding units 750*a*, 750*b*, 750*c*, and 750*d* determined by splitting the first coding unit 700 in vertical and horizontal directions, in a certain order for processing coding units in a row and then processing coding units in a next row (e.g., in a raster scan order or Z-scan order 750*e*).

According to an embodiment, the image decoding apparatus 100 may recursively split coding units. Referring to FIG. 7, the image decoding apparatus 100 may determine the plurality of coding units 710*a* and 710*b*, 730*a* and 730*b*, or 750*a* through 750*d* by splitting the first coding unit 700, and recursively split each of the determined plurality of coding units 710*a* and 710*b*, 730*a* and 730*b*, or 750*a* through 750*d*. A splitting method of the plurality of coding units 710*a* and 710*b*, 730*a* and 730*b*, or 750*a* through 750*d* may correspond to a splitting method of the first coding unit 700. Accordingly, each of the plurality of coding units 710*a* and 710*b*, 730*a* and 730*b*, or 750*a* through 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units, based on a coding unit before being split, is not limited to the above-described example, and various methods may be used to independently process coding units, which are split and determined to various shapes, in a certain order.

Figure 8:
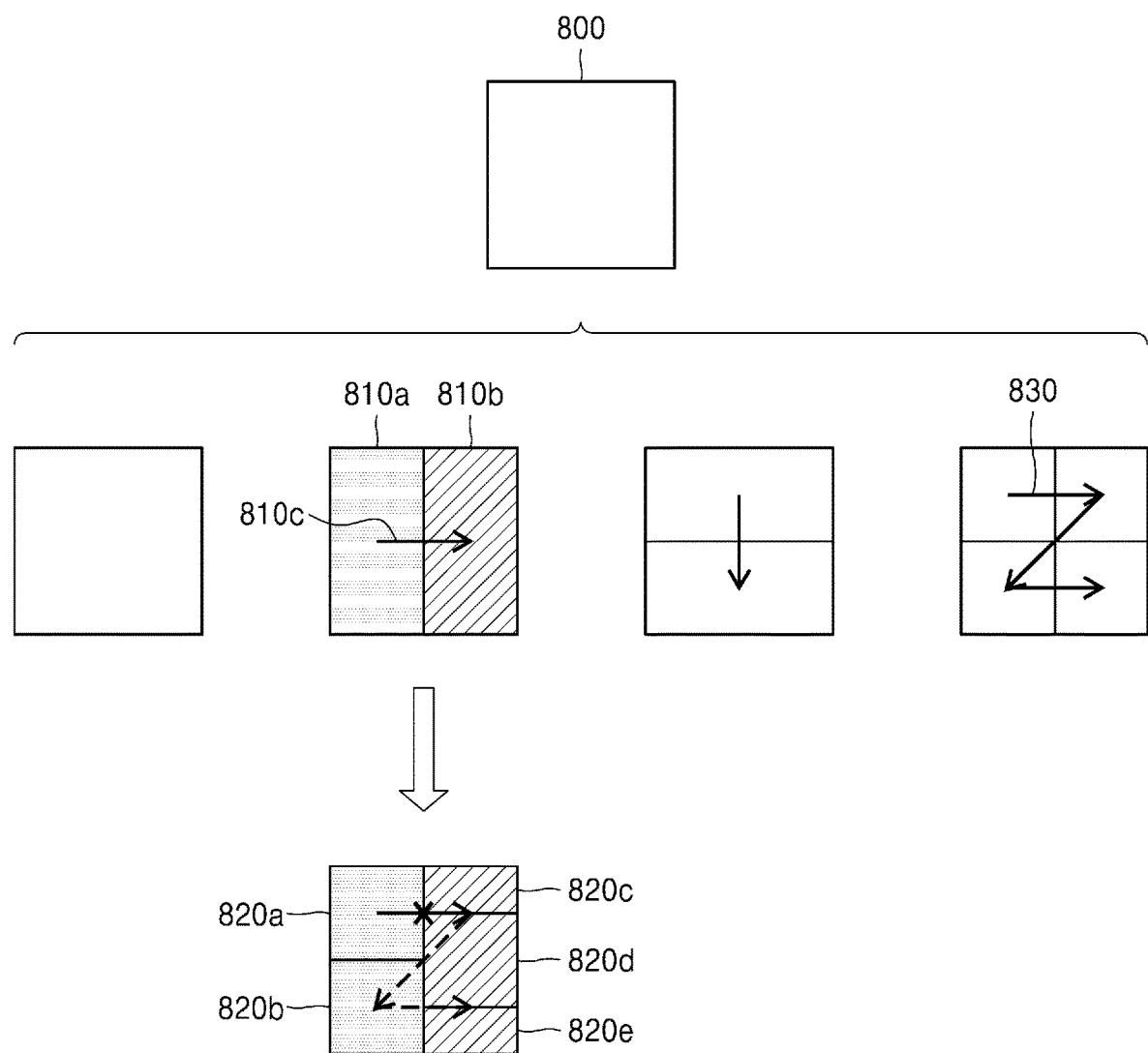
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by an image decoding apparatus, of determining that a current coding unit is to be split into an odd number of coding units, when the coding units are not processable in a predetermined order, according to an embodiment of the disclosure.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c* through 820*e*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c* through 820*e*.

According to an embodiment, the image decoding apparatus 100 may determine whether any coding unit is split into an odd number of coding units, by determining whether the third coding units 820*a* and 820*b*, and 820*c* through 820*e* are processable in a certain order. Referring to FIG. 8, the image decoding apparatus 100 may determine the third coding units 820*a* and 820*b*, and 820*c* through 820*e* by recursively splitting the first coding unit 800. The image decoding apparatus 100 may determine whether any of the first coding unit 800, the second coding units 810*a* and 810*b*, and the third coding units 820*a* and 820*b*, and 820*c* through 820*e* are split into an odd number of coding units, based on at least one of the block shape information or the split shape mode information. For example, the right second coding unit 810*b* among the second coding units 810*a* and 810*b* may be split into an odd number of third coding units 820*c*, 820*d*, and 820*e*. A processing order of a plurality of coding units included in the first coding unit 800 may be a certain order (e.g., a Z-scan order 830), and the image decoding apparatus 100 may determine whether the third coding units 820*c*, 820*d*, and 820*e* determined by splitting the right second coding unit 810*b* into an odd number of coding units satisfy a condition that enables processing in the certain order.

According to an embodiment, the image decoding apparatus 100 may determine whether the third coding units 820*a* and 820*b*, and 820*c* through 820*e* included in the first coding unit 800 satisfy the condition that enables processing in the certain order, and the condition relates to whether at least one of a width or height of the second coding units 810*a* and 810*b* is split in half along a boundary of the third coding units 820*a* and 820*b*, and 820*c* through 820*e*. For example, the third coding units 820*a* and 820*b* determined when the height of the left second coding unit 810*a* of the non-square shape is split in half may satisfy the condition. It may be determined that the third coding units 820*c* to 820*e* do not satisfy the condition because the boundaries of the third coding units 820*c* to 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof will not be provided herein.

Figure 9:
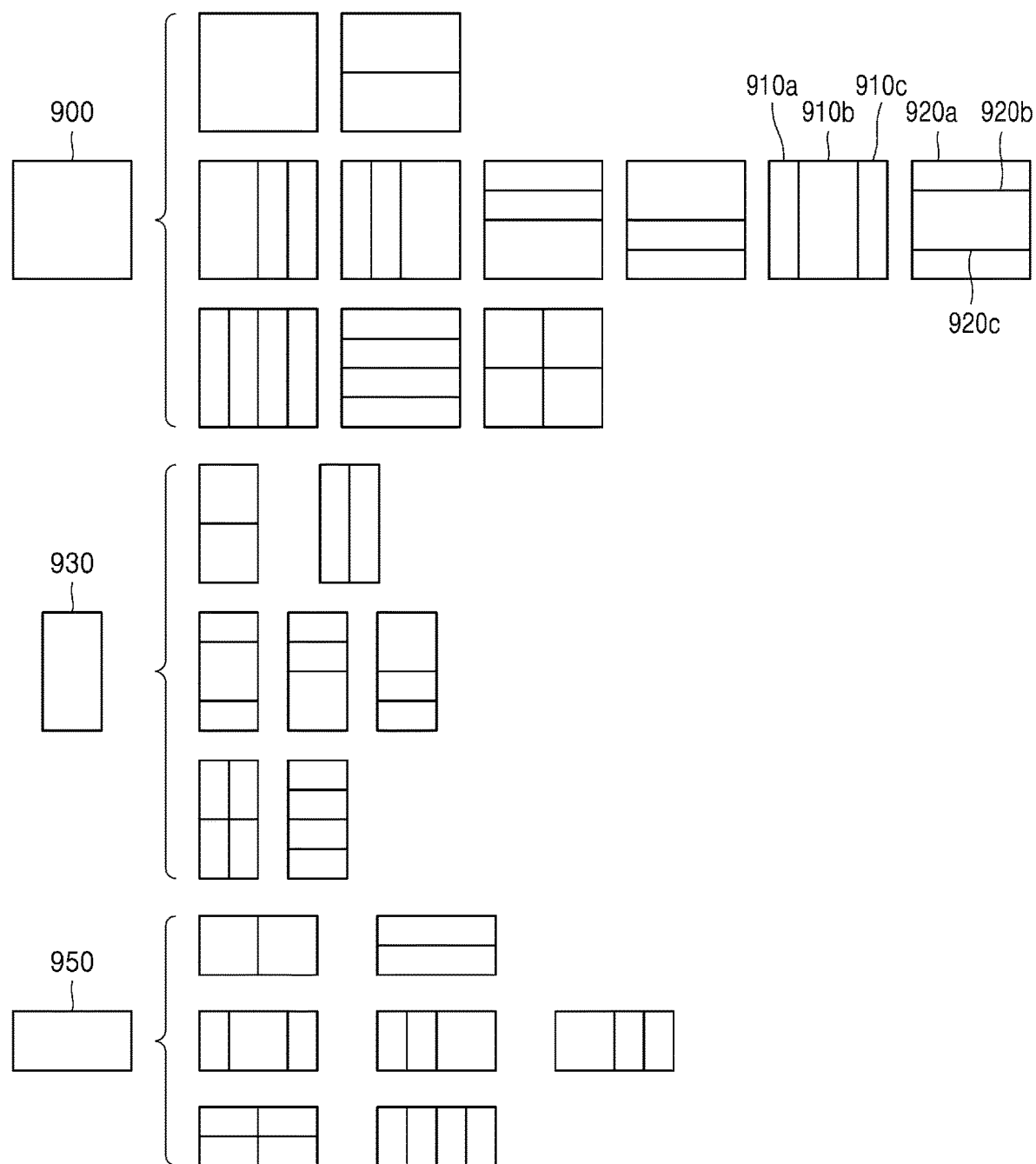
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment of the disclosure.

According to an embodiment, the image decoding apparatus 100 may split a first coding unit 900, based on split shape mode information obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width or height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
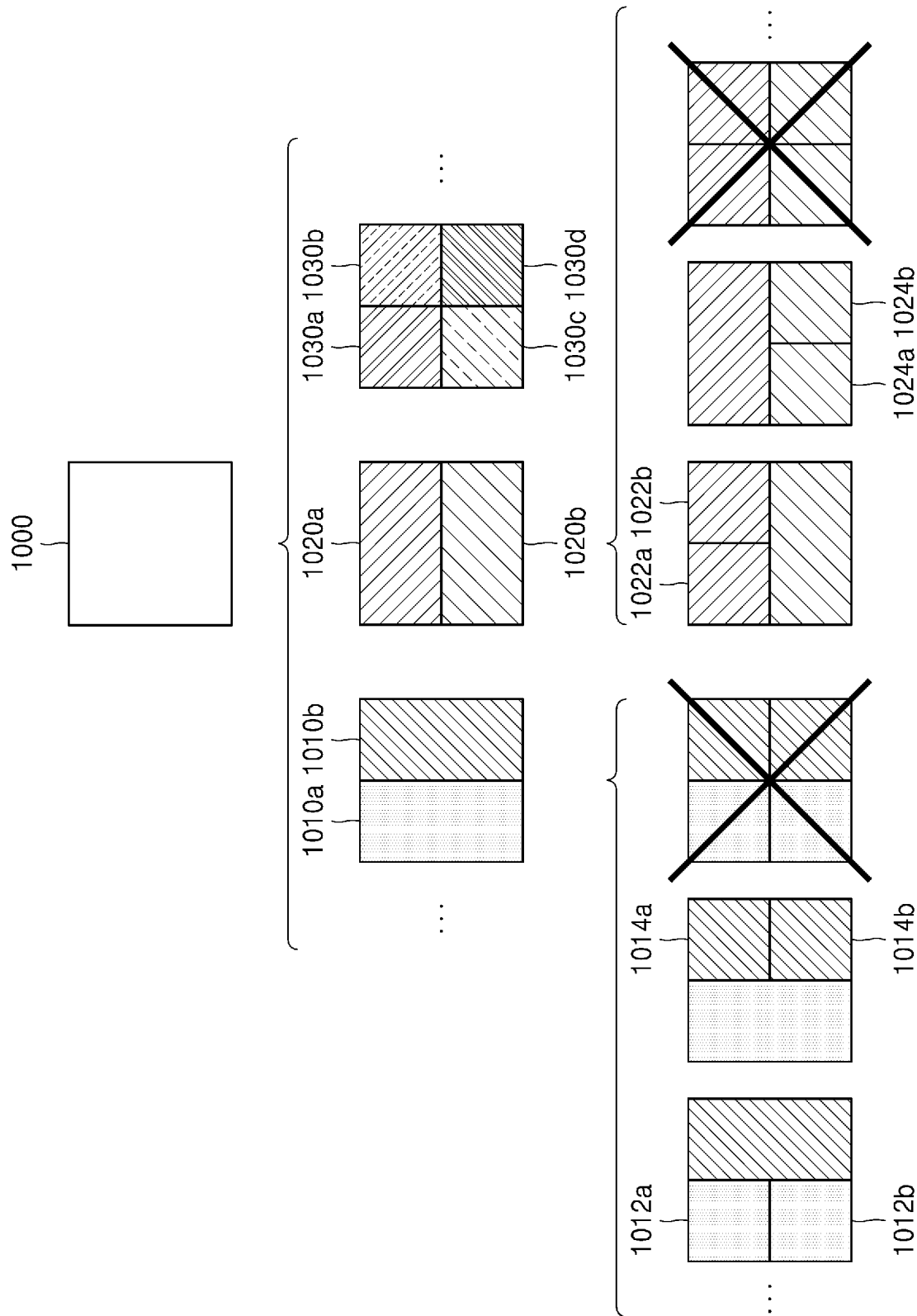
FIG. 10 illustrates that a shape into which a second coding unit is splittable is restricted when the second coding unit having a non-square shape, which is determined as an image decoding apparatus splits a first coding unit, satisfies a certain condition, according to an embodiment.

FIG. 10 illustrates that a shape into which a second coding unit is splittable is restricted when the second coding unit having a non-square shape, which is determined as an image decoding apparatus splits a first coding unit, satisfies a certain condition, according to an embodiment of the disclosure.

According to an embodiment, the image decoding apparatus 100 may determine to split a square first coding unit 1000 into non-square second coding units 1010a, and 1010b or 1020a and 1020b, based on split shape mode information, which is obtained by the receiver 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting, in a horizontal direction, the non-square left second coding unit 1010a determined by splitting the first coding unit 1000 in a vertical direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting, in a vertical direction, the non-square second coding unit 1020a or 1020b determined by splitting the first coding unit 1000 in a horizontal direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
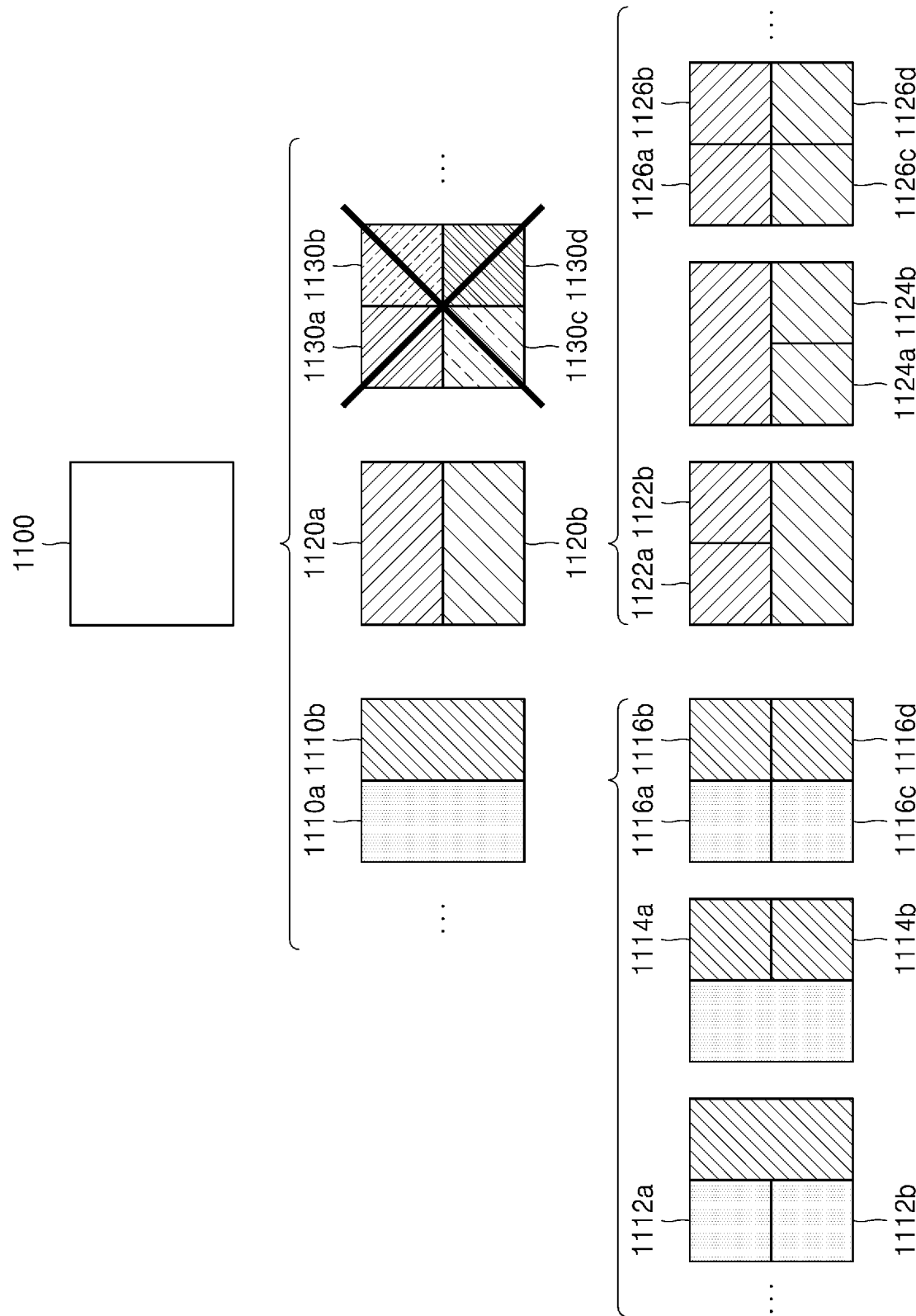
FIG. 11 illustrates a process, performed by an image decoding apparatus, of splitting a square coding unit when split shape mode information is unable to indicate that the square coding unit is split into four square coding units, according to an embodiment.

FIG. 11 illustrates a process, performed by an image decoding apparatus, of splitting a square coding unit when split shape mode information is unable to indicate that the square coding unit is split into four square coding units, according to an embodiment of the disclosure.

According to an embodiment, the image decoding apparatus 100 may determine second coding units 1110a and 1110b or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
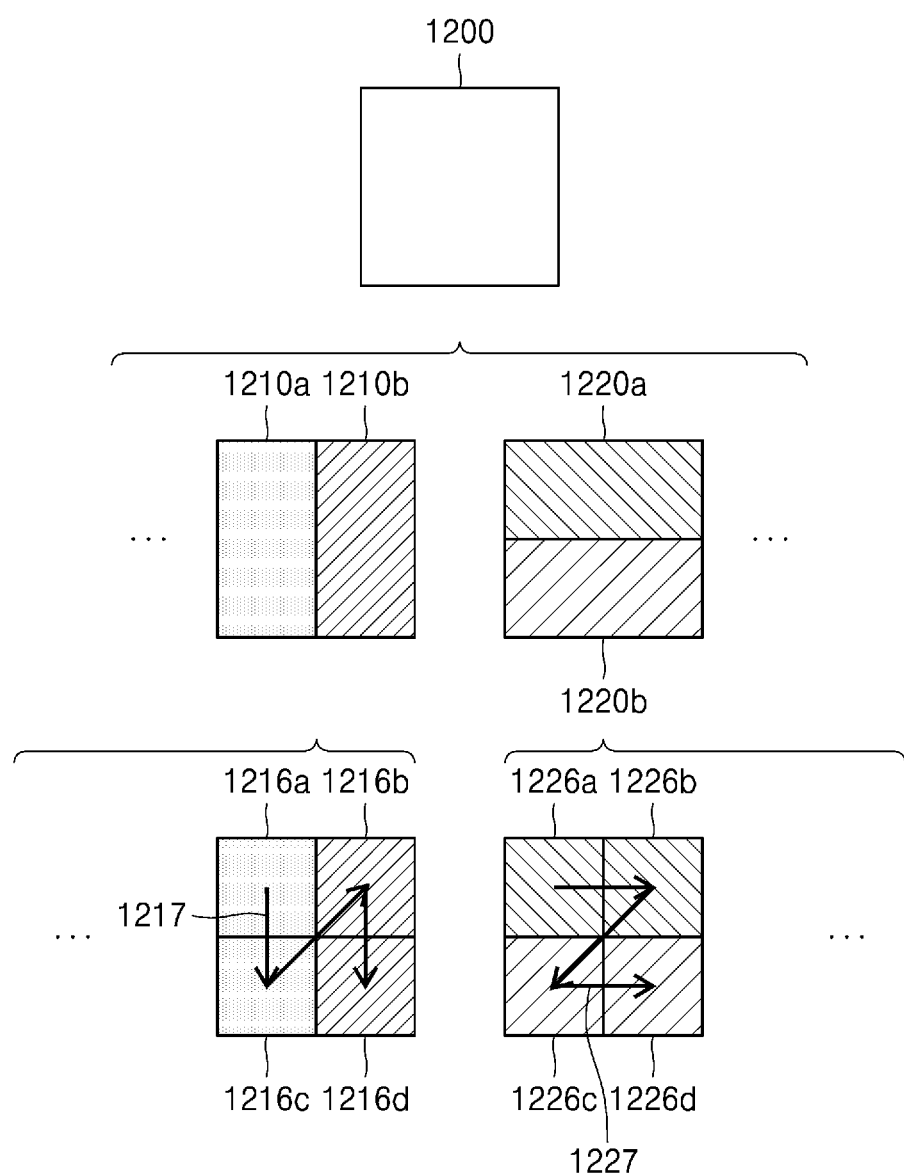
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment of the disclosure.

According to an embodiment, the image decoding apparatus 100 may split a first coding unit 1200, based on split shape mode information. When a block shape indicates a square shape and the split shape mode information indicates to split the first coding unit 1200 in at least one of a horizontal or vertical direction, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting, in a horizontal direction, the second coding units 1210a and 1210b generated by splitting the first coding unit 1200 in a vertical direction, and may determine third coding units 1226a, 1226b, 1226c, and 1226d by splitting, in a vertical direction, the second coding units 1220a and 1220b generated by splitting the first coding unit 1200 in a horizontal direction. An operation of splitting the second coding units 1210a and 1210b or 1220a and 1220b has been described above in relation to FIG. 11, and thus detailed descriptions thereof will not be provided herein.

According to an embodiment, the image decoding apparatus 100 may process coding units in a certain order. An operation of processing coding units in a certain order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d, based on a splitting method of the first coding unit 1200.

According to an embodiment, the image decoding apparatus 100 may determine the third coding units 1216a, 1216b, 1216c, and 1216d by splitting, in a horizontal direction, the second coding units 1210a and 1210b generated by splitting the first coding unit 1200 in a vertical direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting, in a vertical direction, the second coding units 1220a and 1220b generated by splitting the first coding unit 1200 in a horizontal direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment of the disclosure.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300, based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320, based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width or height of the first coding unit 1310 having a size of N×2N. In other words, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width or height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width or height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width or height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width or height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
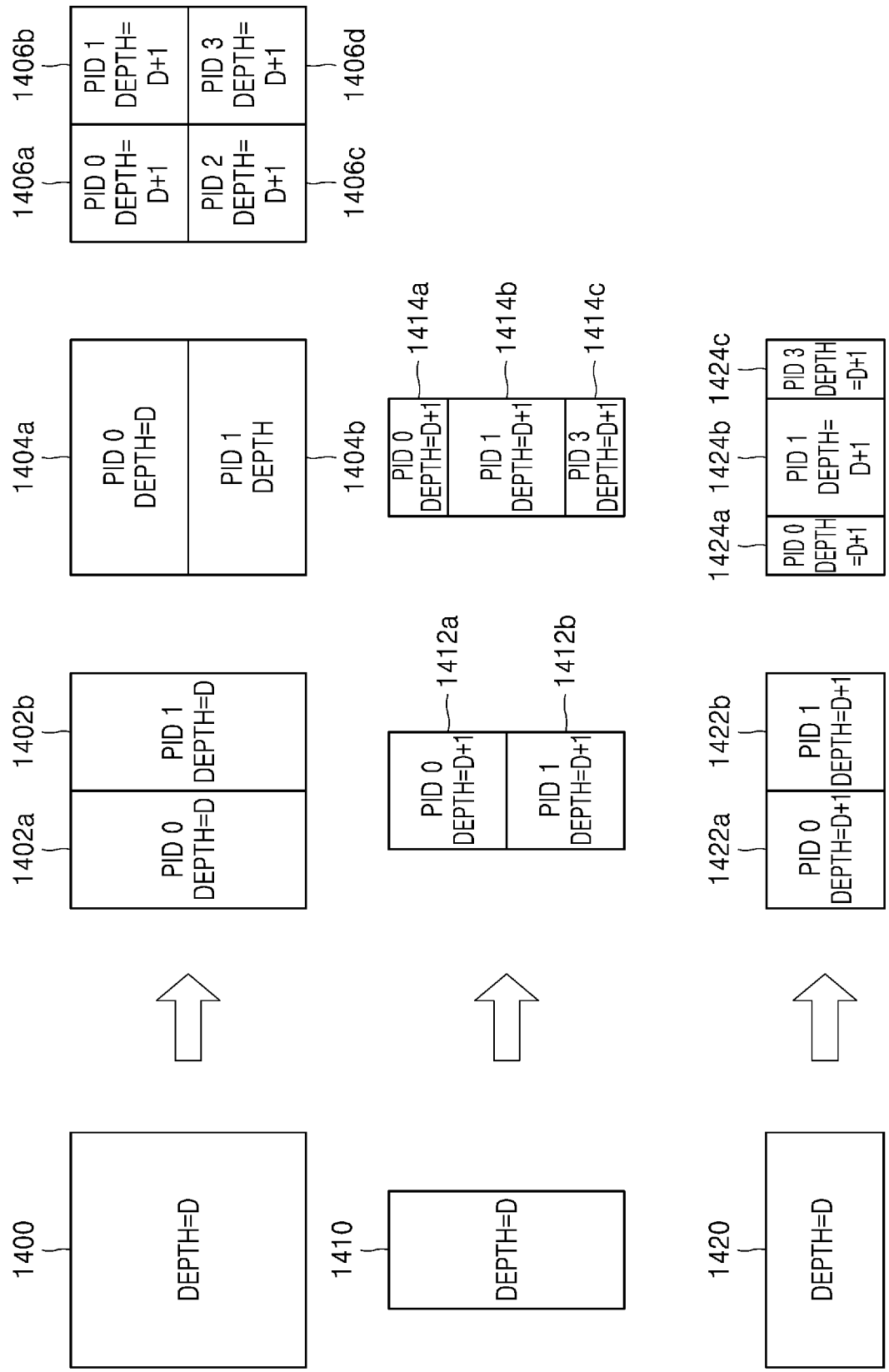
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment of the disclosure.

According to an embodiment, the image decoding apparatus 100 may determine various-shaped second coding units by splitting a square first coding unit 1400. Referring to FIG. 14, the image decoding apparatus 100 may determine second coding units 1402*a* and 1402*b*, 1404*a* and 1404*b*, and 1406*a*, 1406*b*, 1406*c*, and 1406*d* by splitting the first coding unit 1400 in at least one of vertical or horizontal directions, based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an embodiment, depths of the second coding units 1402*a* and 1402*b*, 1404*a* and 1404*b*, and 1406*a*, 1406*b*, 1406*c*, and 1406*d* that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 2100 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is lower than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a side of the non-square first coding unit 1410, a height of which is longer than a width, a depth of the square second coding units 1412a and 1412b is D+1 which is lower than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a side of the first coding unit 1410, a depth of the second coding units 1414a, 1414b, and 1414c may be D+1 which is lower than the depth D of the non-square first coding unit 1410 by 1. The image decoding apparatus 100 may determine depths of coding units split from the non-square first coding unit 1420, a width of which is longer than a height, by using the above-described method of determining depths of coding units split from the first coding unit 1410.

According to an embodiment, the image decoding apparatus 100 may determine PIDs for identifying split coding units, based on a size ratio between the coding units, when an odd number of split coding units do not have equal sizes. Referring to FIG. 14, a coding unit 1414b at a center location among the odd number of split coding units 1414a, 1414b, and 1414c may have a width equal to that of the other coding units 1414a and 1414c and may have a height which is two times that of the other coding units 1414a and 1414c. In other words, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use respective PIDs indicating the plurality of coding units so as to identify the plurality of coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare respective PIDs of an odd number of split coding units with one another in order to determine a coding unit at a center location from among the odd number of coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units, when the split coding units do not have equal sizes. Referring to FIG. 14, the coding unit 1414b generated by splitting the first coding unit 1410 may have a width equal to that of the other coding units 1414a and 1414c, but may have a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit located at the center location and having a different size, by using the PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
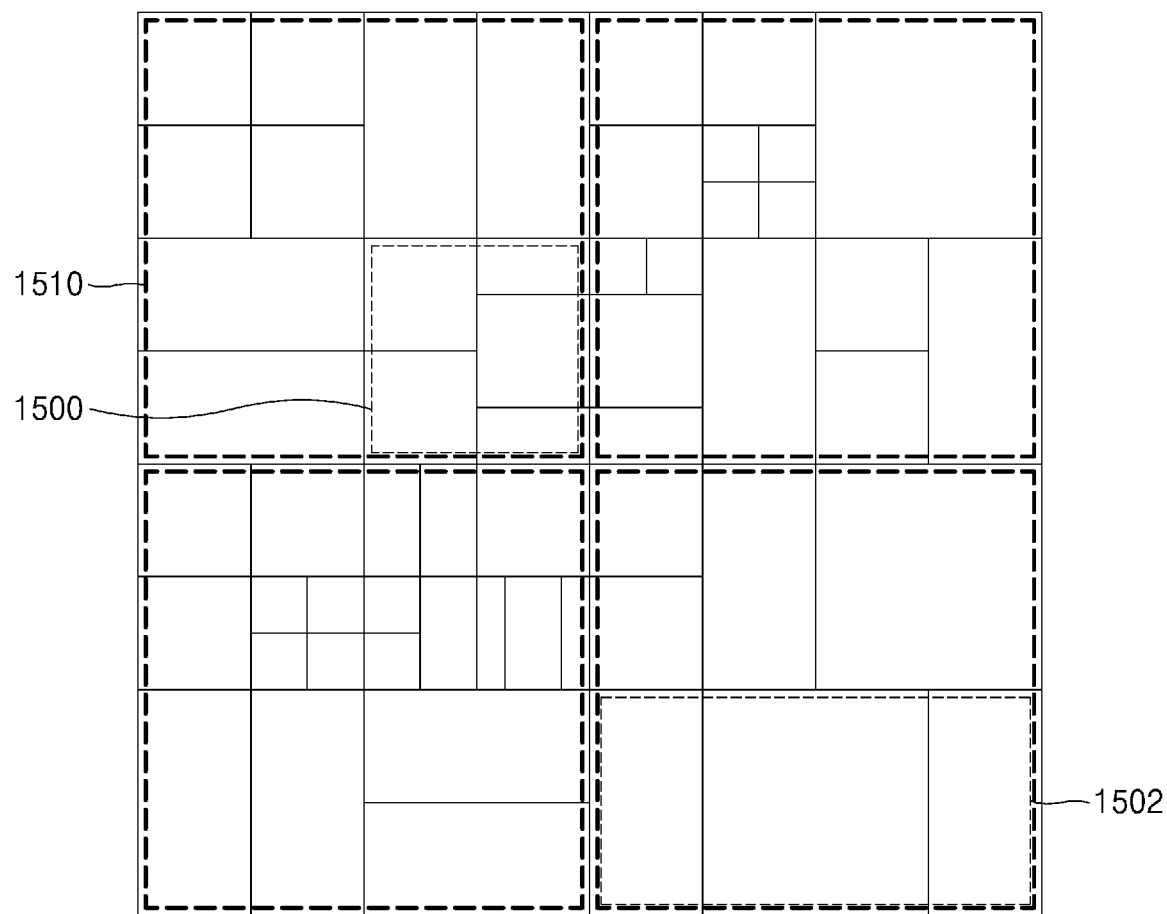
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment of the disclosure.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine a minimum size allowed for the reference data units included in the current picture. Accordingly, the image decoding apparatus 100 may determine various reference data units having various sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of a reference coding unit may be determined based on various data units capable of including one or more reference coding units (e.g., a sequence, a picture, a slice, a slice segment, a tile, a tile group, a largest coding unit, and the like).

According to an embodiment, the receiver 110 of the image decoding apparatus 100 may obtain, from a bitstream, at least one of reference coding unit shape information or reference coding unit size information for each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units, for each slice, slice segment, tile, tile group, or largest coding unit which is a data unit satisfying a certain condition (e.g., a data unit having a size equal to or smaller than a slice) among the various data units (e.g., a sequence, a picture, a slice, a slice segment, a tile, a tile group, a largest coding unit, and the like). The image decoding apparatus 100 may determine the size and shape of reference data units for each data unit that satisfies the certain condition, by using the PID. When the reference coding unit shape information and the reference coding unit size information are obtained and used from the bitstream for each data unit having a relatively small size, efficiency of using the bitstream may not be high, and therefore, only the PID may be obtained and used instead of directly obtaining the reference coding unit shape information and the reference coding unit size information. In this case, at least one of the size or shape of reference coding units corresponding to the PID for identifying the size and shape of reference coding units may be previously determined. That is, the image decoding apparatus 100 may determine at least one of the size or shape of reference coding units included in a data unit serving as a basis for obtaining the PID, by selecting the previously determined at least one of the size or shape of reference coding units according to the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width or height of the largest coding unit may be integer times at least one of the width or height of each reference coding unit. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information or the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information for each largest coding unit, each reference coding unit, or each processing block, and may use the obtained syntax element.

Hereinafter, a method of determining a split rule, according to an embodiment of the disclosure, will be described in detail.

The image decoding apparatus 100 may determine a split rule of an image. The split rule may be pre-determined between the image decoding apparatus 100 and the image encoding apparatus 2200. The image decoding apparatus 100 may determine the split rule of the image, based on information obtained from a bitstream. The image decoding apparatus 100 may determine the split rule, based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule, based on a block shape of a coding unit. The block shape may include a size, shape, a ratio of width and height, and a direction of the coding unit. The image decoding apparatus 100 may pre-determine to determine the split rule based on the block shape of a coding unit. However, embodiments of the disclosure are not limited thereto. The image decoding apparatus 100 may determine the split rule, based on information obtained from a received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The sizes of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule, based on the size of the coding unit. The image decoding apparatus 100 may differently determine an allowable split shape mode, based on the size of the coding unit. For example, the image decoding apparatus 100 may determine whether splitting is allowed, based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 200 and the image decoding apparatus 100. Also, the image decoding apparatus 100 may determine the split rule, based on the information obtained from the bitstream.

The image decoding apparatus 100 may adaptively determine the split rule, based on a location of the coding unit. The image decoding apparatus 100 may adaptively determine the split rule, based on the location of the coding unit in the image.

Also, the image decoding apparatus 100 may determine the split rule such that coding units generated via different splitting paths do not have the same block shape. However, embodiments of the disclosure are not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Figure 16:
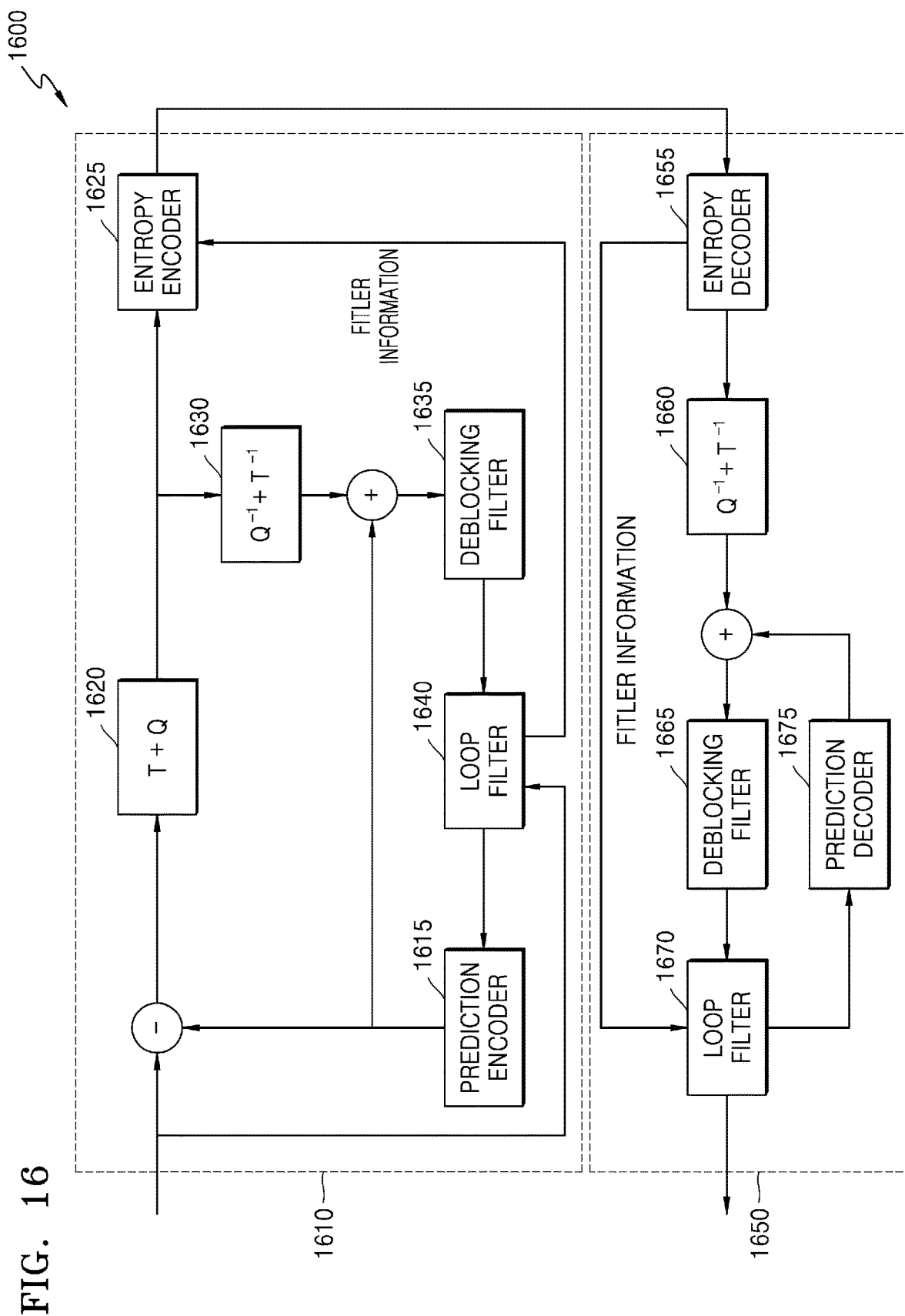
FIG. 16 is a block diagram of an image encoding and decoding system.

FIG. 16 is a block diagram of an image encoding and decoding system.

An encoding end 1610 of an image encoding and decoding system 1600 transmits an encoded bitstream of an image, and a decoding end 1650 thereof outputs a reconstructed image by receiving and decoding the bitstream. The decoding end 1650 may have a similar configuration as the image decoding apparatus 100.

At the encoding end 1610, a prediction encoder 1615 outputs a reference image via inter prediction and intra prediction, and a transformer and quantizer 1620 quantizes residual data between the reference image and a current input image to a quantized transform coefficient and outputs the quantized transform coefficient. An entropy encoder 1625 transforms the quantized transform coefficient by encoding the quantized transform coefficient, and outputs the transformed quantized transform coefficient as a bitstream. The quantized transform coefficient is reconstructed as data of a spatial domain via an inverse quantizer and inverse transformer 1630, and the data of the spatial domain is output as a reconstructed image via a deblocking filter 1635 and a loop filter 1640. The reconstructed image may be used as a reference image of a next input image via the prediction encoder 1615.

Encoded image data among the bitstream received by the decoding end 1650 is reconstructed as residual data of a spatial domain via an entropy decoder 1655 and an inverse quantizer and inverse transformer 1660. Image data of a spatial domain is configured when a reference image and residual data output from a prediction decoder 1675 are combined, and a deblocking filter 1665 and a loop filter 1670 may output a reconstructed image regarding a current original image by performing filtering on the image data of the spatial domain. The reconstructed image may be used by the prediction decoder 1675, as a reference image for a next original image.

The loop filter 1640 of the encoding end 1610 performs loop filtering by using filter information input according to a user input or system settings. The filter information used by the loop filter 1640 is output to the encoding end 1610 and transmitted to the decoding end 1650 together with the encoded image data. The loop filter 1670 of the decoding end 1650 may perform loop filtering based on the filter information input from the decoding end 1650.

Hereinafter, a method and apparatus for encoding or decoding tiles into which a picture is split, in units of tiles, according to an embodiment of the disclosure will be described with reference to FIGS. 17 through 20.

Figure 17:
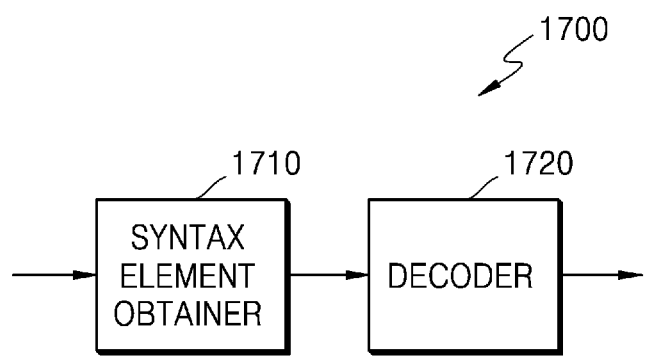
FIG. 17 is a block diagram of a video decoding apparatus according to an embodiment.

FIG. 17 is a block diagram of a video decoding apparatus according to an embodiment of the disclosure.

Referring to FIG. 17, a video decoding apparatus 1700 according to an embodiment of the disclosure may include a syntax element obtainer 1710 and a decoder 1720.

The video decoding apparatus 1700 may obtain a bitstream generated as a result of encoding an image, ascertain locations of slices and tiles into which a picture is split, based on information included in the bitstream, and decode largest coding units and coding units included in the tiles.

The video decoding apparatus 1700 may include a central processor (not shown) for controlling the syntax element obtainer 1710 and the decoder 1720. Alternatively, the syntax element obtainer 1710 and the decoder 1720 may operate respectively by their own processors (not shown), and the processors may operate mutually organically such that the video decoding apparatus 1700 operates as a whole. Alternatively, the syntax element obtainer 1710 and the decoder 1720 may be controlled under control of an external processor (not shown) of the video decoding apparatus 1700.

The video decoding apparatus 1700 may include one or more data storages (not shown) storing input/output data of the syntax element obtainer 1710 and the decoder 1720. The video decoding apparatus 1700 may include a memory controller (not shown) for controlling data input and output of the one or more data storages.

The video decoding apparatus 1700 may perform an image decoding operation including prediction by connectively operating with an internal video decoding processor or an external video decoding processor so as to reconstruct an image via image decoding. The internal video decoding processor of the video decoding apparatus 1700 may perform a basic image decoding operation in a manner that not only a separate processor but also an image decoding processing module included in a central processing apparatus or a graphic processing apparatus perform the basic image decoding operation.

The video decoding apparatus 1700 may be included in the image decoding apparatus 100 described above. For example, the syntax element obtainer 1710 may be included in the bitstream obtainer 110 of the image decoding apparatus 100 of FIG. 1, and the decoder 1720 may be included in the decoder 120 of the image decoding apparatus 100.

The syntax element obtainer 1710 receives a bitstream generated as a result of encoding an image. The bitstream may include information about a current slice. The current slice is one of one or more slices included in the picture, and may include one or more tiles. Each tile may include one or more largest coding units. The decoder 1720 may determine a location of a slice, based on information obtained from the syntax element obtainer 1710, determine a location of a tile included in the slice, and determine a location of a current block included in the tile. The current block is a block generated when an image is split according to a tree structure, and for example, may correspond to a largest coding unit, a coding unit, or a transform unit. The decoder 1720 may decode the one or more tiles included in the current slice according to an encoding order. To this end, the decoder 1720 may decode one or more blocks included in a current tile.

The syntax element obtainer 1710 may determine the current block, based on block shape information and/or information about a split shape mode, which are included in at least one of a sequence parameter set, a picture parameter set, a video parameter set, a slice header, or a slice segment header. Furthermore, the syntax element obtainer 1710 may obtain, from the bitstream, a syntax element corresponding to the block shape information or the information about the split shape mode, for each largest coding unit, each reference coding unit, or each processing block, and may use the obtained syntax element to determine the current block.

According to an embodiment, the syntax element obtainer 1710 may determine a location of a block as a current coding unit within the current tile. For example, the syntax element obtainer 1710 may determine whether a current block is a first largest coding unit within a tile. The current tile may include a plurality of largest coding units. The picture may include a plurality of tiles. A relationship between a largest coding unit, a tile, and a picture will now be described in detail with reference to FIG. 21.

Figure 21:
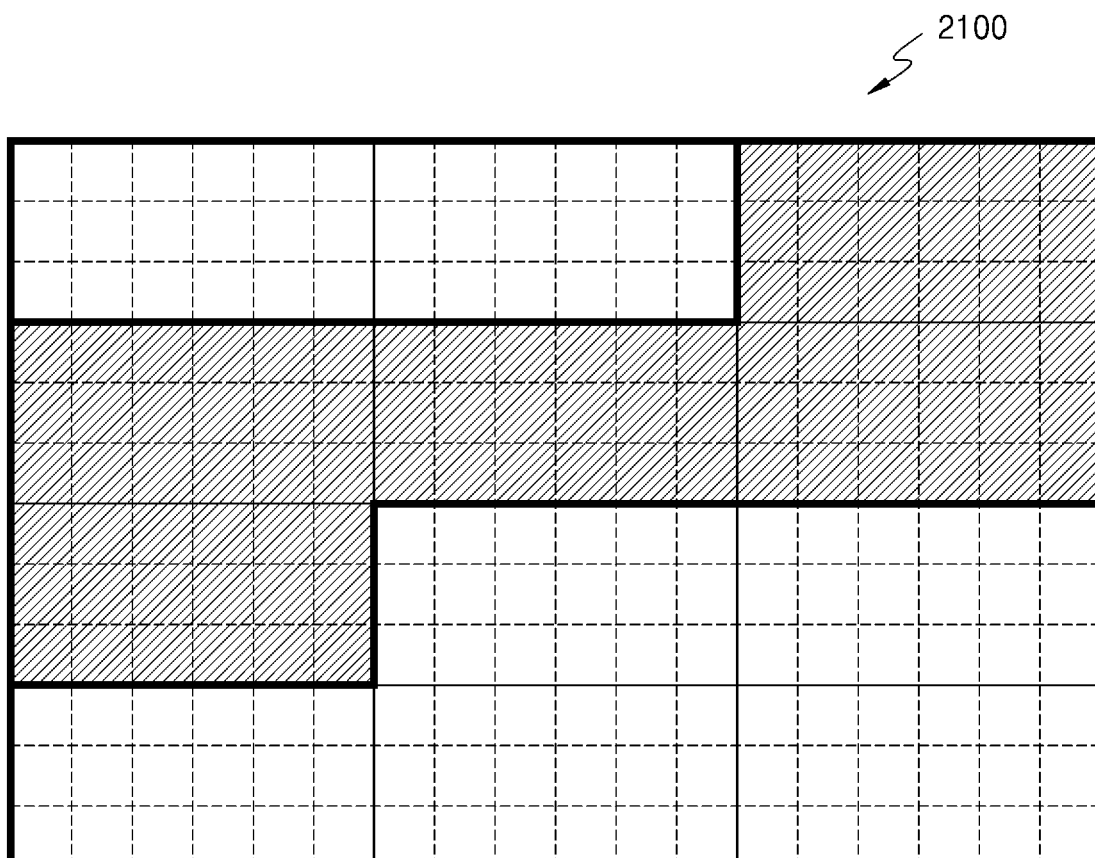
FIGS. 21 and 22 illustrate relationships between largest coding units, tiles, and slices in a tile partitioning method according to an embodiment.
Figure 22:
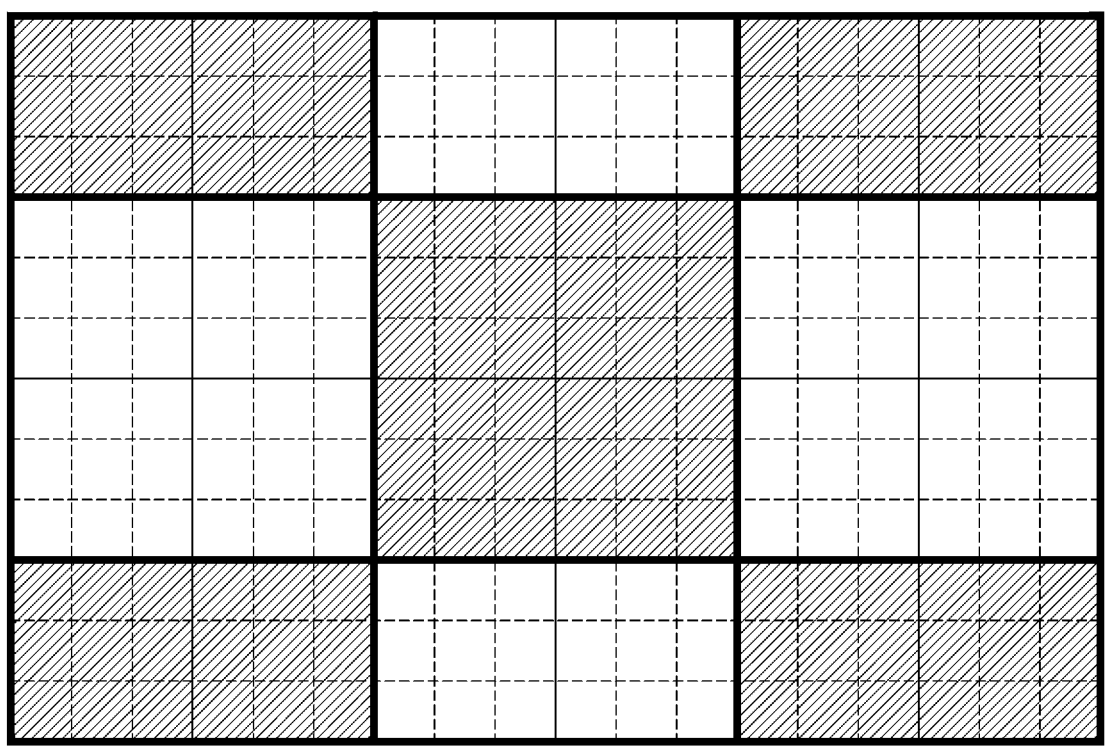

FIGS. 21 and 22 illustrate relationships between largest coding units, tiles, and slices in a tile partitioning method according to an embodiment of the disclosure.

A first picture 2100 of FIG. 21 and a second picture 2200 of FIG. 22 may each be split into a plurality of largest coding units. Square blocks marked by dotted lines are largest coding units. Tiles are rectangular areas marked by thin solid lines within the first picture 2100 and the second picture 2200, and each of the tiles includes one or more largest coding units. Rectangular areas marked by thick solid lines within the first picture 2100 and the second picture 2200 are slices, and each of the slices includes one or more tiles.

The first picture 2100 is split into 18×12 largest coding units, 12 tiles, and three slices, and each of the three slices is a group of tiles connected to each other in a raster-scan direction. Each of the tiles includes six largest coding unit columns (CTU columns) and three largest coding unit rows (CTU rows), and the first picture 2100 includes three tile columns and four tile rows. Each of the tile columns includes four tiles aligned vertically, and each of the tile rows includes six tiles aligned horizontally.

The second picture 2200 is split into 18×12 largest coding units, 24 tiles, and 9 slices, and each of the 9 slices is a group of tiles connected to each other in a rectangular shape. Each of the tiles includes three largest coding unit columns (CTU columns) and three largest coding unit rows (CTU rows), and the second picture 2200 includes six tile columns and four tile rows. Each of the tile columns includes four tiles aligned vertically, and each of the tile rows includes six tiles aligned horizontally.

Because a boundary of each tile is consistent with a boundary of largest coding units, the boundary of each tile may not cross the largest coding units. The video decoding apparatus 1700 decodes the largest coding units included in a tile in a raster scan order, and does not have dependency of data between tiles. Accordingly, the video decoding apparatus 1700 may use information such as a pixel value or a motion vector within a block of adjacent tiles, in order to decode blocks located at a boundary of a tile. Similarly, the video decoding apparatus 1700 may not use information such as a pixel value or a motion vector within a block of adjacent slices, in order to decode blocks located at a boundary of a slice.

Accordingly, the adjacent tiles may be simultaneously decoded, and parallel processing in which the adjacent slices are simultaneously decoded is possible. Because bits generated from each tile are expressed as sub-bitstreams and a start location of each of the sub-bitstreams is signaled through a slice header, entropy decoding operations with respect to tiles may be performed in parallel.

The syntax element obtainer 1710 according to an embodiment may obtain, from a bitstream, identification information of a first tile and identification information of a last tile included in a first slice.

The decoder 1720 according to an embodiment needs to determine identification information of tiles included in a current slice and respective locations of the tiles. The decoder 1720 may determine an index difference between the first tile and the last tile, based on a result of comparing the identification information of the first tile with the identification information of the last tile. The decoder 1720 may determine the number of tiles included in the first slice, by using an index difference between the first tile and the last tile included in the current slice. The decoder 1720 may decode a plurality of tiles included in the first slice in an encoding order by using the number of tiles included in the current slice. To this end, the decoder 1720 may decode one or more blocks included in a current tile.

For example, when a prediction mode of a current block is an intra mode, the decoder 1720 may determine a reference sample from among the samples of a spatially neighboring block located in an intra prediction direction by using intra prediction information of the current block, and may determine prediction samples corresponding to the current block by using the reference sample.

For example, when the prediction mode of the current block is an inter mode, the decoder 1720 may reconstruct the current block by using a motion vector of the current block. The decoder 1720 may determine a reference block within a reference picture by using the motion vector of the current block, and may determine prediction samples corresponding to the current block from reference samples included in the reference block.

When the prediction mode of the current block is not a skip mode, the video decoding apparatus 1700 may parse transform coefficients of the current block from the bitstream, and may obtain residual samples by performing inverse quantization and inverse transformation on the transform coefficients. The decoder 1720 may determine restoration samples of the current block by combining the residual samples of the current block with the prediction samples of the current block.

Each picture is split into one or more tile rows, and is split into one or more tile columns and encoded. Each tile may be a rectangular area including one or more largest coding units into which pictures are split. Tiles may be included in one or more tile rows and may be included in one or more tile columns.

The decoder 1720 according to an embodiment may reconstruct a tile including one or more largest coding units by reconstructing the blocks included in a largest coding unit. The decoder 1720 may reconstruct a slice including one or more tiles and may reconstruct a picture including one or more slices.

The video decoding apparatus 1700 according to an embodiment may select and reconstruct a slice wanting to be reconstructed from among slices that constitute a picture. In other words, a video encoding apparatus 1900 may split a picture into a plurality of slices to achieve parallel processing, and may encode the slices in parallel. Separately, an area for independent display or independent reconstruction may exist as a region of interest (ROI) slice within the same picture. A slice for parallel processing may include tiles, and similarly, the ROI slice may include tiles. The slice for parallel processing and the ROI slice may overlap each other and may include the same tiles. Embodiments of the slice for parallel processing and the ROI slice will now be described in detail with reference to FIGS. 23 and 24.

Figure 23:
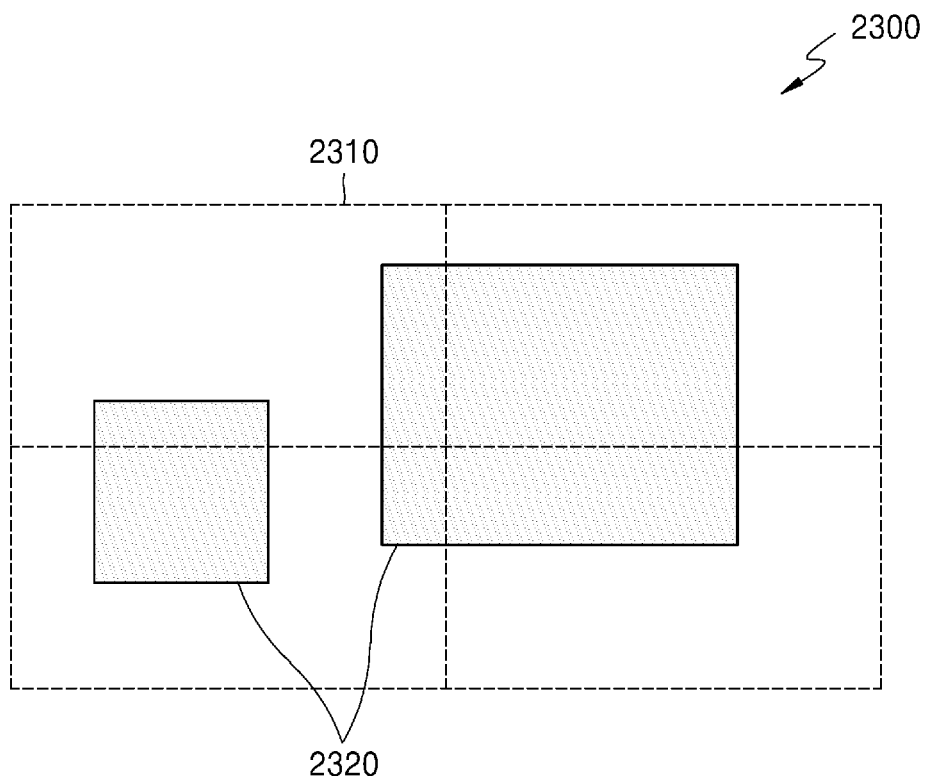
FIG. 23 illustrates slices for parallel processing and region of interest (ROI) slices, according to an embodiment.

FIG. 23 illustrates slices for parallel processing and ROI slices, according to an embodiment of the disclosure.

Slices 2310 for parallel processing included in the picture 2300 are indicated by dashed lines, and ROI slices 2320 are indicated by solid lines.

The video encoding apparatus 1900 may split the picture 2300 into the slices 2310 for parallel processing, and may encode the tiles included in each of the slices 2310 in parallel by using a plurality of processors. A detailed operation of the video encoding apparatus 1900 will be described later with reference to FIGS. 19 and 20. The video decoding apparatus 1700 may reconstruct the slices 2310 for parallel processing by encoding the tiles included in the slices 2310. When there are the ROI slices 2310, the video decoding apparatus 1700 may selectively reconstruct the ROI slices 2310 by decoding the tiles included in the ROI slices 2310 in parallel by using a plurality of processors.

Figure 24:
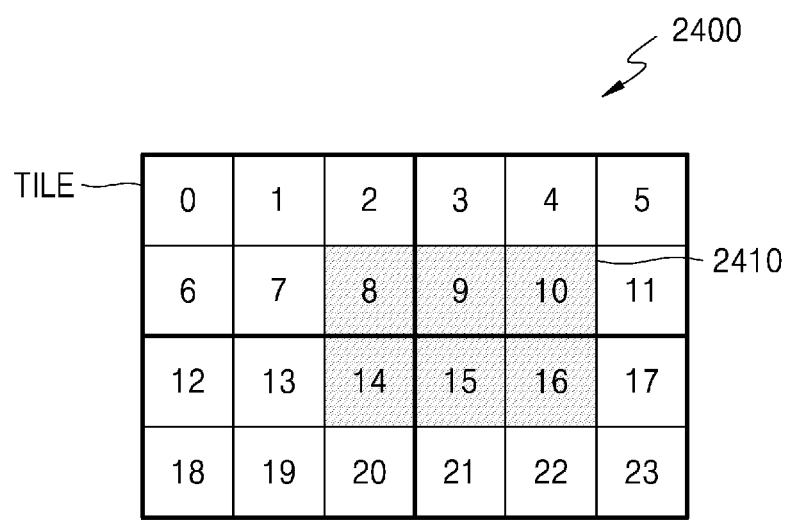
FIG. 24 illustrates a layout of tiles included in a slice for parallel processing and an ROI slice, according to an embodiment.

FIG. 24 illustrates a layout of tiles included in a slice for parallel processing and an ROI slice, according to an embodiment of the disclosure.

The video encoding apparatus 1900 may encode a plurality of tiles by using a plurality of processes by splitting a picture 2400 into 24 tiles. The video encoding apparatus 1900 may process a first slice, a second slice, a third slice, and a fourth slice in parallel, the first slice including tile 0, tile 1, tile 2, tile 6, tile 7, and tile 8, the second slice including tile 3, tile 4, tile 5, tile 9, tile 10, and tile 11, the third slice including tile 12, tile 13, tile 14, tile 18, tile 19, and tile 20, and the fourth slice including tile 15, tile 16, tile 17, tile 21, tile 22, and tile 23. The video decoding apparatus 1700 may reconstruct the first slice, the second slice, the third slice, and the fourth slice, which are parallel-processing slices, in parallel by encoding the tiles belonging to the first slice, the second slice, the third slice, and the fourth slice.

Information may not be shared between the tiles included in different slices. For example, the video encoding apparatus 1900 may not refer to encoding information of the tile 0 included in the first slice when encoding the tile 3 included in the second slice. Similarly, the video decoding apparatus 1700 may not be able to decode the tile 3 included in the second slice by referring to the encoding information of the tile 0 included in the first slice.

Information may be shared between the tiles included in the same slice. For example, the video encoding apparatus 1900 may refer to encoding information of the tile 18 included in the third slice when encoding the tile 19 included in the third slice. Similarly, the video decoding apparatus 1700 may decode the tile 19 included in the third slice by referring to the encoding information of the tile 18 included in the third slice.

The video encoding apparatus 1900 according to an embodiment may set an ROI slice 2410 in addition to the slices 2310 for parallel processing. The tile 8, the tile 9, the tile 10, the tile 14, the tile 15, and the tile 16 included in the ROI slice 2410 may be processed in parallel.

Information may be shared between tiles belonging to the same parallel-processing slice from among the tiles belonging to the ROI slice 2410. For example, because the tile 15 and the tile 16 are all included in the ROI slice 2410 and at the same time are included in the fourth slice, the video encoding apparatus 1900 may refer to encoding information of the tile 15 when encoding the tile 16. Similarly, the video decoding apparatus 1700 may decode the tile 16 by referring to the encoding information of the tile 15.

Information may not be shared between tiles belonging to different parallel-processing slices from among the tiles belonging to the ROI slice 2410. For example, because the tile 8 and the tile 9 are all included in the ROI slice 2410 but the tile 8 belongs to the first slice and the tile 9 belongs to the second slice, the video encoding apparatus 1900 may not refer to encoding information of the tile 8 when encoding the tile 9. Similarly, the video decoding apparatus 1700 may decode the tile 9 by referring to the encoding information of the tile 8.

The video encoding apparatus 1900 may configure a bitstream with pieces of information generated by grouping the tiles included in a slice that is to be reconstructed by the video decoding apparatus 1700 and encoding the grouped tiles. For example, the video encoding apparatus 1900 including a plurality of video codec processors may encode the tiles in parallel, and may configure a bitstream by grouping the tiles belonging to each parallel-processing slice. The video decoding apparatus 1700 may reconstruct parallel-processing slices by decoding the tiles belonging to the same parallel-processing slice in parallel.

The video encoding apparatus 1900 and the video decoding apparatus 1700 according to an embodiment may use the ROI slice 2410 in the field of a 360-degree image or a surveillance image. For example, the video encoding apparatus 1900 may configure a bitstream with information generated by encoding the tiles belonging to the ROI slice 2410. The video decoding apparatus 1700 may reconstruct the tiles by decoding the pieces of information included in the bitstream, and may reconstruct the ROI slice 2410 including the reconstructed tiles. Information about the tiles belonging to the parallel processing slices is needed to check a referencing probability between tiles.

Accordingly, the video encoding apparatus 1900 may encode information about the tiles constituting the bitstream, namely, not only decoding slice map information including information about the tiles belonging to the ROI slice 2310 but also encoding slice map information including information about the tiles belonging to the parallel processing slices. Thus, the video decoding apparatus 1700 may determine a referencing probability among the tiles included in the ROI slice 2310 by comparing the decoding slice map information with the encoding slice map information, while reconstructing the ROI slice 2310 by decoding the tiles constituting the bitstream.

For example, the video encoding apparatus 1900 may define, as below, decoding slice map information for mapping slices for configuring and decoding the bitstream with the tiles belonging to the slices, and encoding slice map information for parallel processing, and may encode the decoding slice map information and the encoding slice map information.

Decoding slice map information{
First slice: tiles 0-1-2-3-4-5-6-7-11-12-13-17-18-19-20-21-22-23;
Second slice: tiles 8-9-10-14-15-16;}
Encoding slice map information{
First slice: tiles 0-1-2-6-7-8;
Second slice: tiles 3-4-5-9-10-11;
Third slice: tiles 12-13-14-18-19-20;
Fourth slice: tiles 15-16-17-21-22-23;}

The video decoding apparatus 1700 according to an embodiment may sequentially decode the tiles belonging to each slice by using the decoding slice map information obtained from the bitstream. Because the tiles may be parallel-processed, different processors included in the video decoding apparatus 1700 may decode a plurality of tiles in parallel.

The video decoding apparatus 1700 according to an embodiment may determine a use probability of neighboring tiles located around a current tile by using the encoding slice map information. In other words, the decoder 1720 may determine whether the current tile may be decoded using the neighboring tiles, by using the encoding slice map information.

In detail, the syntax element obtainer 1710 according to an embodiment may obtain the decoding slice map information and the encoding slice map information from the bitstream. The decoder 1720 may determine whether tiles belonging to the ROI slice 2410 belong to the same parallel processing slice or different parallel processing slices, by comparing the decoding slice map information with the encoding slice map information.

For example, because the tile 9 and the tile 10 are included in the second slice of a decoding slice map and the second slice of an encoding slice map, the decoder 1720 may decode the tile 10 by referring to encoding information of the tile 9.

However, because the tile 14 and the tile 15 are included in the second slice in the decoding slice map but the tile 14 belongs to the third slice and the tile 15 belongs to the fourth slice in the encoding slice map, the decoder 1720 may not decode the tile 15 by referring to encoding information of the tile 14.

As another example, instead that the decoding slice map information and the encoding slice map information are signaled, information about a predictable tile may be signaled through a tile header or a slice header when decoding the current tile. For example, the syntax element obtainer 1710 may obtain, from the bitstream, identification information indicating an available tile from among tiles spatially adjacent to each tile from the tile header or the slice header. The decoder 1720 may determine one or more referenceable neighboring tiles, such as a left tile, an upper tile, an upper left tile, and an upper right tile, from the identification information indicating the available tile. The decoder 1720 may decode the current tile by predicting encoding information of the current tile, by using encoding information of the determined available tile, such as a reconstructed image sample, an encoding mode, a motion vector, or a coefficient value.

A video decoding method, performed by the video decoding apparatus 1700 according to an embodiment, for decoding the tiles included in each of slices included in a picture in order to reconstruct the slices in units of slices will now be described with reference to FIG. 18.

Figure 18:
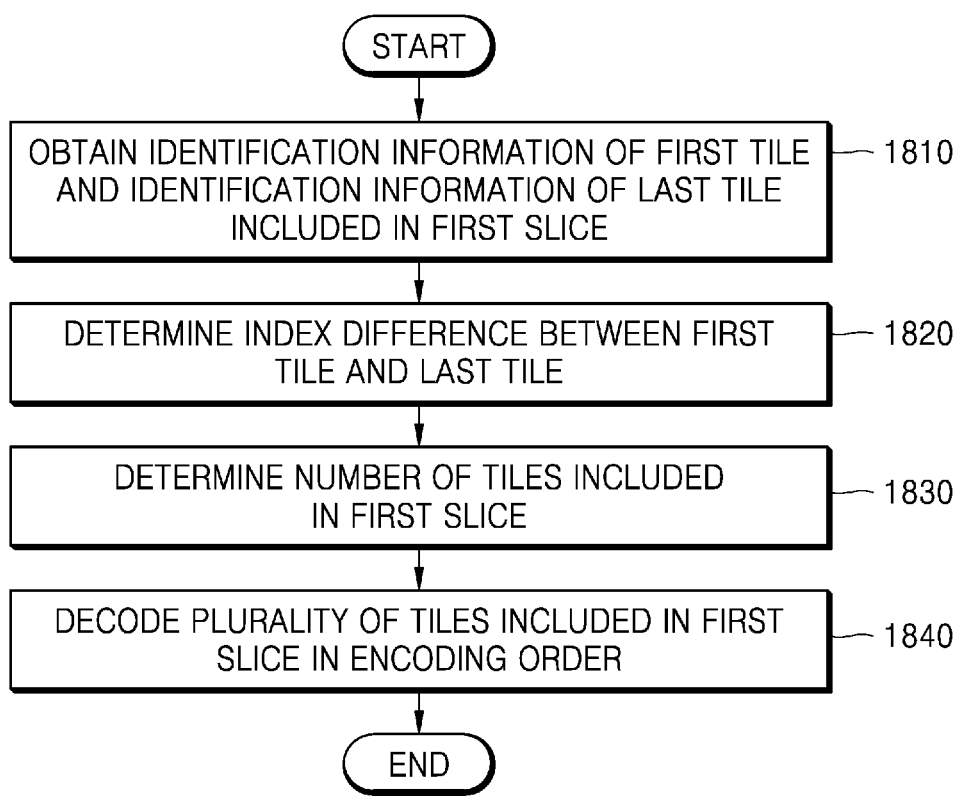
FIG. 18 is a flowchart of a video decoding method according to an embodiment.

FIG. 18 is a flowchart of a video decoding method according to an embodiment of the disclosure.

In operation 1810, the syntax element obtainer 1710 according to an embodiment may obtain, from a bitstream, identification information of a first tile and identification information of a last tile included in a first slice.

In operation 1820, the decoder 1720 according to an embodiment may determine an index difference between the first tile and the last tile, based on a result of comparing the identification information of the first tile with the identification information of the last tile.

In operation 1830, the decoder 1720 according to an embodiment may determine the number of tiles included in the first slice, by using the index difference between the first tile and the last tile.

In operation 1840, the decoder 1720 according to an embodiment may decode a plurality of tiles included in the first slice in an encoding order by using the number of tiles, the identification information of the first tile, and the identification information of the last tile.

The picture may be split into one or more tile rows and may be split into one or more tile columns. Each tile is a rectangular area including one or more largest coding units into which pictures are split. Tiles may be included in the one or more tile rows and may be included in one or more tile columns. A current tile may be reconstructed by reconstructing a current block, and a current slice including the current tile may be reconstructed.

The video decoding apparatus 1700 according to an embodiment may obtain information about the width of a tile column and information about the height of a tile row from among the tiles into which the picture is split. The video decoding apparatus 1700 according to an embodiment may determine the size of each of the tiles into which the picture is split, based on the information about the width of the tile column and the information about the height of the tile row. In other words, because a tile is located at each intersection between a tile column and a tile row, the width of the tile column may be the width of each tile, and the height of the tile row may be height of each tile.

According to another embodiment, the video decoding apparatus 1700 may obtain information about the number of tile columns included in the picture in a horizontal direction and information about the number of tile rows included in the picture in a vertical direction. The information about the width of each tile column may be obtained based on the number of tile columns in a horizontal direction, and the information about the height of each tile row may be obtained based on the number of tile rows in a vertical direction.

The video decoding apparatus 1700 according to an embodiment may determine the number of tiles included in each slice including some tiles included in the picture, and may reconstruct the slice by decoding the tiles included in the slice. The decoder 1720 may determine the number of tiles included in each slice through operations 1820 and 1830.

In operation 1820, when the identification information of the first tile is greater than the identification information of the last tile, the decoder 1720 according to an embodiment may determine, as the index difference between the first tile and the last tile, a value determined by adding the number of tiles included in the picture to a value determined by subtracting the identification information of the first tile from the identification information of the last tile.

In operation 1820, when the identification information of the first tile is not greater than the identification information of the last tile and a column number of the first tile is less than or equal to that of the last tile, the decoder 1720 according to an embodiment may determine, as the index difference between the first tile and the last tile, a value determined by subtracting the identification information of the first tile from the identification information of the last tile.

In operation 1820, when the identification information of the first tile is not greater than the identification information of the last tile and a column number of the first tile is greater than that of the last tile, the decoder 1720 according to an embodiment may determine, as the index difference between the first tile and the last tile, a value determined by adding the number of tile columns included in the picture to a value determined by subtracting the identification information of the first tile from the identification information of the last tile.

As another example, the decoder 1720 may determine each of the index of the first tile and the index of the last tile by using the identification information of the first tile and the identification information of the last tile obtained by the syntax element obtainer 1710. In this case, the decoder 1720 may determine the index difference between the first tile and the last tile by using the index of the first tile and the index of the last tile.

In detail, the decoder 1720 according to an embodiment may determine the index of the first tile, based on the identification information of the first tile. Similarly, the decoder 1720 according to an embodiment may determine the index of the last tile, based on the identification information of the last tile.

When the index of the first tile is greater than the index of the last tile and the column index of the first tile is greater than the column index of the last tile, the decoder 1720 may determine, as the index difference between the first tile and the last tile, a value determined by summing a value determined by adding the total number of tiles included in the picture to a value determined by subtracting the index of the first tile from the index of the last tile and the number of tile columns included in the picture.

When the index of the first tile is greater than the index of the last tile and the column index of the first tile is not greater than the column index of the last tile, the decoder 1720 may determine, as the index difference between the first tile and the last tile, a value determined by adding the total number of tiles included in the picture to a value determined by subtracting the index of the first tile from the index of the last tile.

When the index of the first tile is not greater than the index of the last tile and the column index of the first tile is greater than the column index of the last tile, the decoder 1720 may determine, as the index difference between the first tile and the last tile, a value determined by adding the number of tile columns included in the picture to a value determined by subtracting the index of the first tile from the index of the last tile.

The decoder 1720 according to an embodiment may determine the number of tile columns and the number of tile rows included in a slice, by using the index difference between the first tile and the last tile. In detail, the decoder 1720 may determine the number of tile rows included in the slice, by using a quotient determined by dividing the index difference between the first tile and the last tile by the number of tile columns included in the picture. Similarly, the decoder 1720 may determine the number of tile columns included in the slice, by using a quotient determined by dividing the index difference between the first tile and the last tile by the number of tile columns included in the picture. The decoder 1720 may determine, as the number of tiles included in the slice, a value obtained by multiplying the number of tile columns included in the slice by the number of tile rows included in the slice.

As described above with reference to FIGS. 23 and 24, the picture may be split into a plurality of tiles, the picture may be split into a plurality of encoding slices that do not overlap each other, and each of the plurality of encoding slices may include one or more tiles from among the plurality of tiles. In this case, the syntax element obtainer 1710 according to an embodiment may obtain encoding slice map information including information about the tiles included in the encoding slices, and decoding slice map information including information about the tiles included in a decoding slice for a display area. Accordingly, the decoder 1720 may decode a tile overlapping in the encoding slice and the decoding slice, by using the encoding slice map information and the decoding slice map information.

In detail, when a first tile and a second tile from among tiles included in a current decoding slice, based on the decoding slice map information, are also included in a current encoding slice according to the encoding slice map information, the decoder 1720 may decode the first tile by referring to the second tile. When the first tile is included in the current encoding slice and the second tile is not included therein according to the encoding slice map information, the decoder 1720 may set the second tile in an unpredictable state.

The video decoding apparatus 1700 according to an embodiment may determine a reference picture list for each of the plurality of tiles. The decoder 1720 may decode the current tile from among the plurality of tiles by referring to a tile at a certain location allocated to the current tile from a first reference picture included in a reference picture list of the current tile. A detailed description of the reference picture list of each tile will be given later with reference to FIGS. 26 and 27.

The syntax element obtainer 1710 according to an embodiment may obtain arbitrary location information of a second slice from the bitstream, and the decoder 1720 may determine whether the second slice is a slice at an arbitrary location, based on the arbitrary location information of the second slice. When the second slice is determined to be the slice at the arbitrary location, the decoder 1720 may determine identification numbers of tiles present at the arbitrary location included in the second slice. The decoder 1720 may decode largest coding units included in tiles. A detailed description of a slice at an arbitrary location will be given later with reference to FIG. 38.

When the second slice is the slice at the arbitrary location, the syntax element obtainer 1710 may obtain, from the bitstream, information indicating the number of remaining slices except for the first tile in the second slice. The decoder 1720 may determine the number of tiles included in the second slice, based on the information indicating the number of remaining slices. The syntax element obtainer 1710 may obtain, from the bitstream, information indicating an identification information difference between the current tile and a tile of just previous identification information for each of the tiles included in the second slice. A value determined by adding identification information of the first tile included in the second slice and the information indicating the identification information difference to the just previous identification information may be determined as identification information of the current tile.

In the video decoding apparatus 1700 according to an embodiment, there may be a motion constraint in which motion referencing is possible only in a temporally corresponding type group. A motion constraint between tiles will now be described in detail with reference to FIG. 25.

Figure 25:
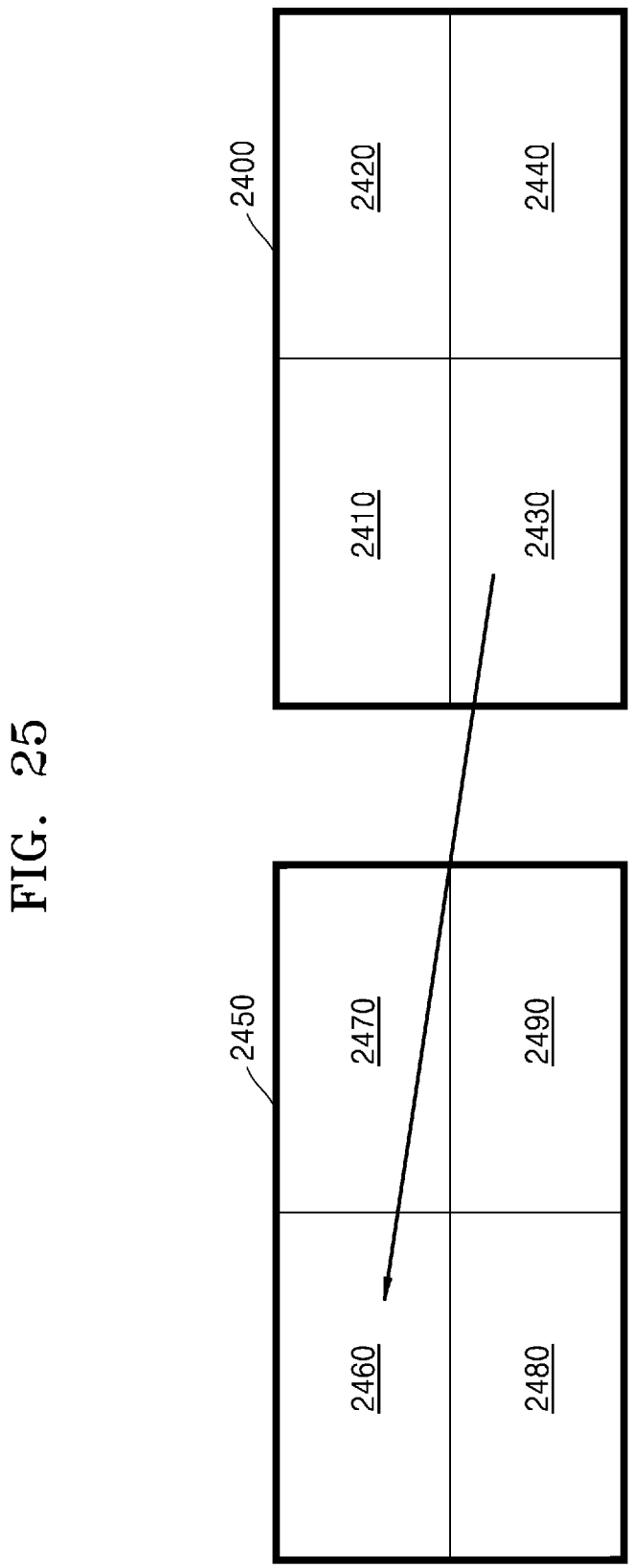
FIG. 25 illustrates a limited range of motion compensation according to an embodiment.

FIG. 25 illustrates a limited range of motion compensation according to an embodiment of the disclosure.

A first picture 2400 may be split into tiles 2410, 2420, 2430, and 2440, and a second picture 2450 may be split into tiles 2460, 2470, 2480, and 2490. When a reference picture index of the first picture 2400 indicates the second picture 2450, a motion vector of the current tile 2430 may indicate only a block within the reference tile 246.

Such a motion constraint between tiles may extend to a tile group.

According to an embodiment, a first tile group may include a plurality of tiles adjacent to one another from among tiles into which a first picture is split, and a second tile group may include tiles corresponding to locations of the tiles included in the first tile group from among a second picture. The first tile group may be a first slice including a first tile, and the second tile group may be a second slice including a second tile.

When a reference picture of the first tile from among the tiles included in the first tile group is the first picture, the video decoding apparatus 1700 may have a motion constraint that allows the motion vector of a first block included in the first tile to indicate a block included in the tiles included in the second tile group. In this case, the video decoding apparatus 1700 may not allow the motion vector of the first block to indicate a block of the second picture located outside the second tile group.

On the other hand, when there are no motion constraints allowing the motion vector of the first block to indicate a block included in the tiles included in the second tile group, the video decoding apparatus 1700 may allow the motion vector of the first block to indicate a block of the second picture even when the block of the second picture is located outside the second tile group, because the block is a block of the second picture.

In addition, the video decoding apparatus 1700 may selectively determine a reference tile group that the first tile group may refer to. For example, when the reference picture is split into a plurality of tile groups, information for selecting one of the plurality of tile groups as a reference group of the first tile group may be set, and a reference block to be indicated by the motion vector of the current block may be determined within the selected tile group.

As another example, a motion vector may be allowed to be determined within a plurality of tile groups including from a tile group present at a location corresponding to a current tile group within the reference picture to a selectively added tile group.

The video decoding apparatus 1700 according to an embodiment may obtain information about a current tile or a current tile group from a tile group header or a tile header.

When a motion constraint is applied to the current tile, based on the obtained information, a block belonging to the current tile may refer to only an internal area of a tile at the same location as the current tile in a reference image, or may refer to only an internal area of a tile having the same tile index as the current tile even when the tile is not at the same location as the current tile. The decoder 1720 may additionally signal the index of a tile to which the current tile is to refer, and the block of the current tile may refer to only the internal area of the tile corresponding to the tile index.

Similarly, when information about the current tile group indicates that a motion constraint is applied to the current tile group, a block belonging to the current tile group may refer to only an internal area of a tile group at the same location as the current tile group in the reference image or may refer to only an internal area of a tile group having the same tile group index as the current tile group even when the tile is not at the same location as the current tile group. The decoder 1720 may additionally signal the index of a tile group to which the current tile group is to refer, and the block of the current tile may refer to only the internal area of the tile corresponding to the tile group index. Each tile group may be a sub-picture of a picture.

When information about the current tile group indicates that a motion constraint is not applied to the current tile, a reference picture of the current block included in the current tile group may be determined to be a picture unit rather than a sub-picture unit. Accordingly, the index of a current sub-picture belonging to the current tile group may correspond to a location of a sub-picture within a current picture, and the index of a reference sub-picture including a reference block indicated by the motion vector of a current block may correspond to a location of a sub-picture within a reference picture of the current block. Even when the index of the current sub-picture is different from the index of the reference sub-picture, because the reference block belongs to the reference picture of the current block, the reference block may be used for motion prediction of the current block.

A video encoding apparatus for performing encoding on each of tiles into which a picture is split will now be described with reference to FIG. 19.

Figure 19:
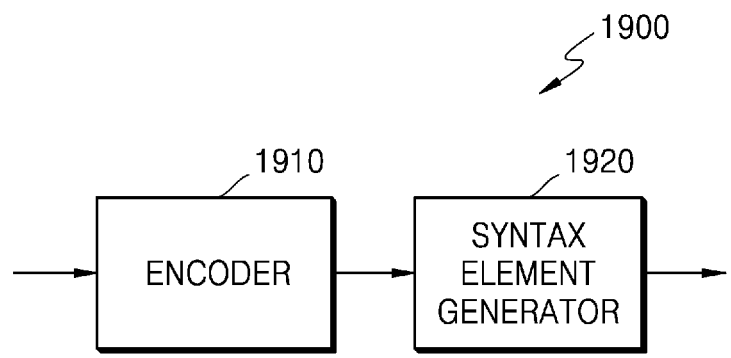
FIG. 19 is a block diagram of a video encoding apparatus according to an embodiment.

FIG. 19 is a block diagram of a video encoding apparatus according to an embodiment of the disclosure.

Referring to FIG. 19, a video encoding apparatus 1900 according to an embodiment may include an encoder 1910 and a syntax element generator 1920.

The encoder 1910 according to an embodiment may split a picture into coding units and encode the coding units. The encoder 1910 may split the picture into one or more tiles by using different processors, and each processor may encode each of the coding units included in each tile. The syntax element generator 1920 may output syntax elements corresponding to pieces of encoding information generated as a result of the encoding, in the form of a bitstream.

The video encoding apparatus 1900 according to an embodiment may include a central processor (not shown) for controlling the encoder 1910 and the syntax element generator 1920. Alternatively, the encoder 1910 and the syntax element generator 1920 may operate respectively by their own processors (not shown), and the processors may operate mutually organically such that the video encoding apparatus 1900 operates as a whole. Alternatively, the encoder 1910 and the syntax element generator 1920 may be controlled under control of an external processor (not shown) of the video encoding apparatus 1900.

The video encoding apparatus 1900 may include one or more data storages (not shown) where input/output data of the encoder 1910 and the syntax element generator 1920 is stored. The video encoding apparatus 1900 may include a memory controller (not shown) for controlling data input and output of the one or more data storages.

The video encoding apparatus 1900 may perform an image encoding operation including prediction by connectively operating with an internal video encoding processor or an external video encoding processor so as to encode an image. The internal video encoding processor of the video encoding apparatus 1900 according to an embodiment may perform a basic image encoding operation in a manner that not only a separate processor but also an image decoding processing module included in a central processing apparatus or a graphic processing apparatus perform the basic image decoding operation.

When the tiles included in a first slice are discontinuously located within the picture, the encoder 1910 according to an embodiment may encode the tiles included in the first slice according to an order. The encoder 1910 according to an embodiment may encode identification information of a first tile located at an upper left end from among the tiles included in the first slice. The encoder 1910 according to an embodiment may also encode identification information of a last tile located at a lower right end from among the tiles included in the first slice.

The syntax element generator 1920 may output a bitstream including information about a current slice generated by encoding an image. The current slice is one of one or more slices included in the picture, and may include one or more tiles. Each tile may include one or more largest coding units.

For example, when a prediction mode of a current block is an intra mode, the encoder 1910 may determine a reference sample from among the samples of a spatially neighboring block located in an intra prediction direction by using intra prediction information of the current block, and may determine prediction samples corresponding to the current block by using the reference sample.

For example, when the prediction mode of the current block is an inter mode, the encoder 1910 may determine a motion vector to predict the current block. The encoder 1910 may determine a reference block within a reference picture, and may determine a motion vector indicating the reference block from the current block. The encoder 1910 may determine a residual sample between current blocks from reference samples included in the reference block and may perform transformation and quantization on the residual sample, based on a transform unit, thereby generating a quantized transform coefficient.

The encoder 1910 may encode a tile including one or more blocks including a current block, and may determine a location of a slice including the one or more tiles. The current block is a block generated when an image is split according to a tree structure, and for example, may correspond to a largest coding unit, a coding unit, or a transform unit. The encoder 1910 may encode the blocks included in each tile in an encoding order, and may encode the tiles included in each slice in an encoding order. The encoder 1910 may encode a plurality of tiles in parallel by using a plurality of processors.

Because a boundary of each tile is consistent with a boundary of largest coding units, the boundary of each tile may not cross the largest coding units. The video encoding apparatus 1900 encodes the largest coding units included in a tile in a raster scan order, and does not have dependency of data between tiles. Accordingly, the video encoding apparatus 1900 may use information such as a pixel value or a motion vector within a block of adjacent tiles, in order to encode blocks located at a boundary of a tile. Similarly, the video encoding apparatus 1900 may not use information such as a pixel value or a motion vector within a block of adjacent slices, in order to encode blocks located at a boundary of a slice.

Accordingly, the adjacent tiles may be simultaneously encoded, and parallel processing in which the adjacent slices are simultaneously encoded is possible. Because bits generated from each tile are expressed as sub-bitstreams and a start location of each of the sub-bitstreams is signaled through a slice header, entropy encoding operations with respect to tiles may be performed in parallel.

For example, the syntax element generator 1920 may include block shape information and/or information about a split shape mode in at least one of a sequence parameter set (SPS), a picture parameter set (PPS), a video parameter set (VPS), or a slice header. Furthermore, the syntax element generator 1920 may generate a bitstream by encoding a syntax element corresponding to the block shape information or the information about the split shape mode, for each largest coding unit, each reference coding unit, or each processing block.

Because a slice is a group of tiles set as a single area, the encoder 1910 does not need to encode the tiles included in the slice in an order. However, the syntax element generator 1920 may encode information capable of identifying tiles that may be included in the single slice, and may include the encoded information in the bitstream. For example, even when an ROI area or a single connected wrap-around area in a 360-degree image is inconsistent with a slice for parallel processing, the ROI area or the single connected wrap-around area may be determined during encoding. Accordingly, the syntax element generator 1920 may set the ROI area or the wrap-around area as a single slice, and may generate and encode information about the tiles included in the slice.

The syntax element generator 1920 according to an embodiment may generate a bitstream by encoding the respective pieces of identification information of the first tile and the last tile included in the first slice. The respective pieces of identification information of the first tile and the last tile included in the first slice may be included in the slice header or the tile header.

During decoding, an index difference between the first tile and the last tile may be determined based on a result of comparing the identification information of the first tile with the identification information of the last tile. The decoder 1720 may determine the number of tiles included in the first slice, by using the index difference between the first tile and the last tile included in the current slice. Accordingly, the decoder 1720 may decode a plurality of tiles included in the first slice in an encoding order by using the number of tiles included in the current slice.

The video encoding apparatus 1900 and the video decoding apparatus 1700 according to an embodiment may use a wrap-around slice or a wrap-around tile group in order to encode and decode a 360-degree image or a surveillance image. The wrap-around slice (tile group) refers to a slice that is disconnected by the boundary of a picture on the picture but may be connected by connecting a lower end boundary to an upper end boundary (or a left boundary and a right boundary) of the picture. Because a slice includes a plurality of tiles, the slice and the tile group may be interpreted as the same meaning. The wrap-around slice or the wrap-around tile group will now be described in detail with reference to FIGS. 28 through 31.

Figure 28:
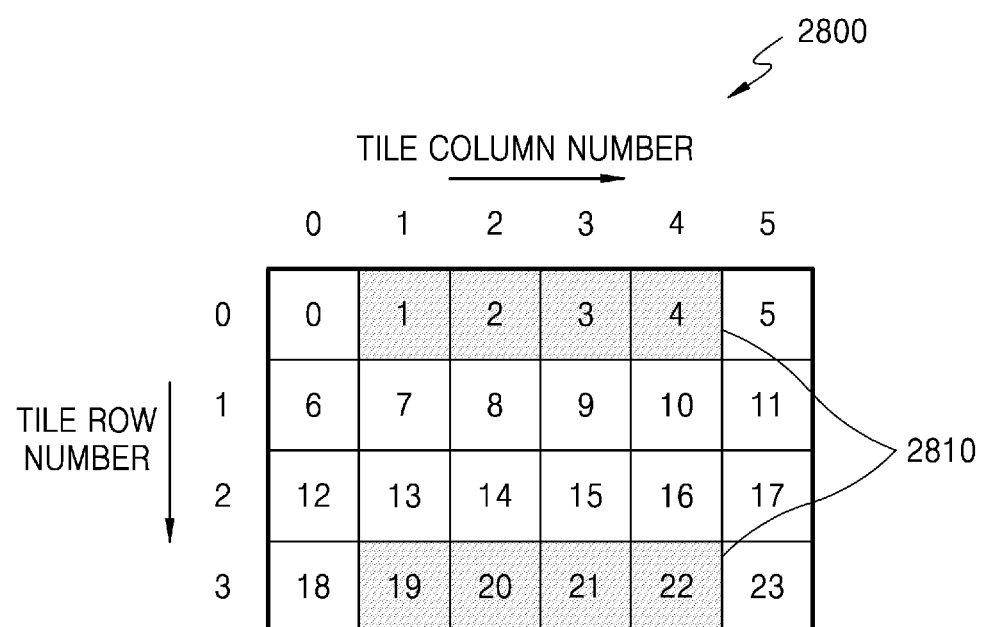
FIG. 28 is a diagram illustrating a wrap-around slice according to an embodiment.

FIG. 28 is a diagram illustrating a wrap-around slice according to an embodiment of the disclosure.

A picture 2800 includes 6 tile columns and 4 tile rows, and the identification numbers of tiles may be set to be 0 to 23 according to a raster scan order.

A wrap-around slice 2810 of the picture 2800 may include tile 1, tile 2, tile 3, tile 4, tile 19, tile 20, tile 21, and tile 22. When an upper end boundary and a lower end boundary of the picture 2800 are connected to each other, an upper portion of an object actually displayed by the wrap-around slice 2810 may be displayed on the tile 19, the tile 20, the tile 21, and the tile 22 and a lower portion thereof may be displayed on the tile 1, the tile 2, the tile 3, and the tile 4. Accordingly, when the picture 2800 is spread, the wrap-around slice 2810 appears to be cut.

The tile 19, the tile 20, the tile 21, the tile 22, the tile 1, the tile 2, the tile 3, and the tile 4 not connected to each another by the wrap-around slice 2810 may be grouped. According to identification numbers, the tile 1, the tile 2, the tile 3, and the tile 4 are ahead of the tile 19, the tile 20, the tile 21, and the tile 22. However, according to the location of the actual object, the tile 19, the tile 20, the tile 21, the tile 22, the tile 1, the tile 2, the tile 3, and the tile 4 may be encoded in this stated order (wrap-around order).

Alternatively, according to a raster scan order within the picture 2800, tiles may be encoded in an order of the tile 1, the tile 2, the tile 3, the tile 4, the tile 19, the tile 20, the tile 21, and the tile 22.

The video decoding apparatus 1700 may decode the tiles included in the wrap-around slice 2810 in the same order as an encoding order. The video decoding apparatus 1700 may obtain identification information 19 of the first tile and identification information 4 of the last tile from the slice header for the current slice from the bitstream. Because the identification information 19 of the first tile is greater than the identification information 4 of the last tile and a tile column number 1 of the first tile is not greater than a tile column number 4 of the last tile, the video decoding apparatus 1700 may ascertain that the current slice is a wrap-around slice where the lower end boundary and the upper end boundary of the picture 2800 are connected to each other.

According to an embodiment, when a preset encoding order is a wrap-around order, the video decoding apparatus 1700 may reconstruct the wrap-around slice 2810 by performing decoding in an order of the tile 19, the tile 20, the tile 21, the tile 22, the tile 1, the tile 2, the tile 3, and the tile 4. According to an embodiment, when a preset encoding order is a raster-scan order, the video decoding apparatus 1700 may reconstruct the wrap-around slice 2810 by performing decoding in an order of the tile 1, the tile 2, the tile 3, the tile 4, the tile 19, the tile 20, the tile 21, and the tile 22.

Figure 29:
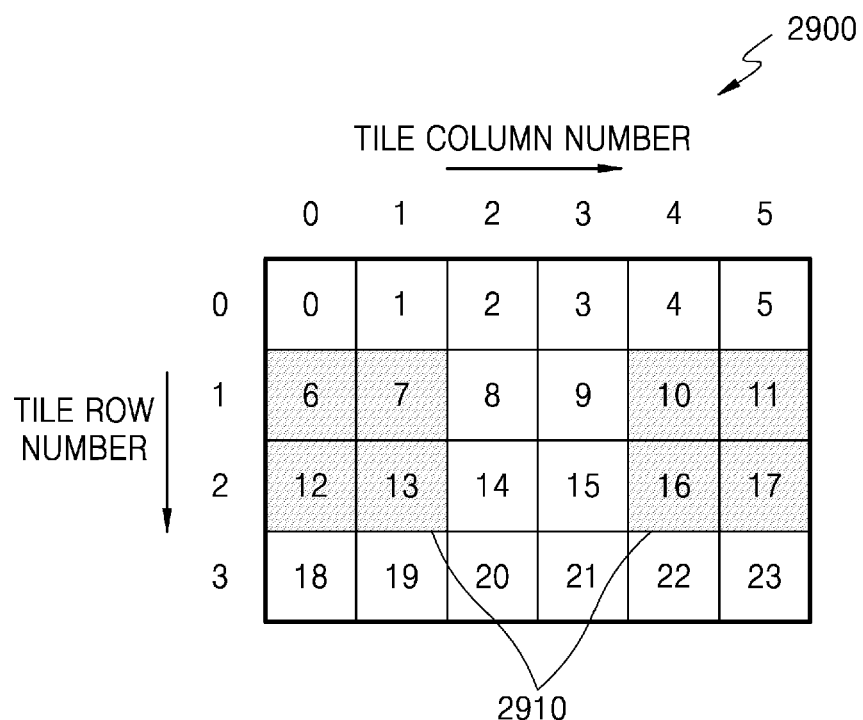
FIG. 29 is a diagram illustrating a wrap-around slice according to an embodiment.

FIG. 29 is a diagram illustrating a wrap-around slice according to an embodiment of the disclosure.

A picture 2900 includes 6 tile columns and 4 tile rows, and the identification numbers of tiles may be set to be 0 to 23 according to a raster scan order.

A wrap-around slice 2910 of the picture 2900 may include tile 6, tile 7, tile 10, tile 11, tile 12, tile 13, tile 16, and tile 17. When a left boundary and a right boundary of the picture 2900 are connected to each other, a left portion of an object actually displayed by the wrap-around slice 2910 may be displayed on the tile 10, the tile 11, the tile 16, and the tile 17 and a right portion thereof may be displayed on the tile 6, the tile 7, the tile 12, and the tile 13. Accordingly, when the picture 2900 is spread, the wrap-around slice 2910 appears to be cut.

The tile 6, the tile 7, the tile 10, the tile 11, the tile 12, the tile 13, the tile 16, and the tile 17 not connected to each other by the wrap-around slice 2910 may be grouped. According to identification numbers, the tile 6, the tile 7, the tile 12, and the tile 13 are ahead of the tile 10, the tile 11, the tile 16, and the tile 17. However, according to the location of the actual object, the tile 10, the tile 11, the tile 6, the tile 7, the tile 16, the tile 17, the tile 12, and the tile 13 may be encoded in this stated order (wrap-around order).

Alternatively, according to a raster scan order within the picture 2900, tiles may be encoded in an order of the tile 6, the tile 7, the tile 10, the tile 11, the tile 12, the tile 13, the tile 16, and the tile 17.

The video decoding apparatus 1700 may decode the tiles included in the wrap-around slice 2910 in the same order as an encoding order. The video decoding apparatus 1700 may obtain identification information 10 of the first tile and identification information 13 of the last tile from the slice header for the current slice from the bitstream. Because a tile column number 4 of the first tile is not greater than a tile column number 2 of the last tile, the video decoding apparatus 1700 may ascertain that the current slice is a wrap-around slice where the left boundary and the right boundary of the picture 2900 are connected to each other.

According to an embodiment, when a preset encoding order is a wrap-around order, the video decoding apparatus 1700 may reconstruct the wrap-around slice 2910 by performing decoding in an order of the tile 10, the tile 11, the tile 6, the tile 7, the tile 16, the tile 17, the tile 12, and the tile 13. According to an embodiment, when a preset encoding order is a raster-scan order, the video decoding apparatus 1700 may reconstruct the wrap-around slice 2910 by performing decoding in an order of the tile 6, the tile 7, the tile 10, the tile 11, the tile 12, the tile 13, the tile 16, and the tile 17.

Wrap-around slices including tiles in which a tile adjacent to a boundary of a picture is connected to a tile adjacent to an opposite boundary of the picture have been proposed above with reference to FIGS. 28 and 29. The video encoding apparatus 1900 and the video decoding apparatus 1700 according to an embodiment may use a wrap-around tile including blocks in which a block adjacent to a boundary of a tile is connected to a block adjacent to an opposite boundary of the tile. Similar to the encoding order of the tiles in the wrap-around slice, an encoding order of the blocks in the wrap-around tile may be set to be a raster-scan order or a wrap-around order.

Figure 30:
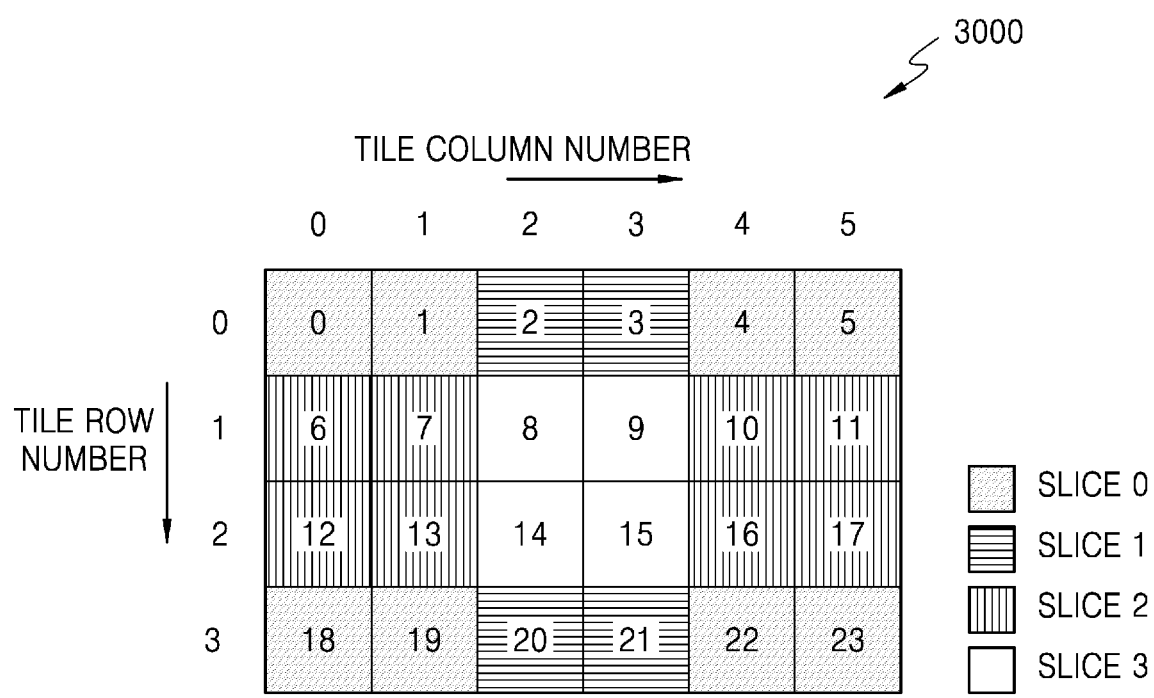
FIG. 30 is a diagram illustrating wrap-around slices according to an embodiment.

FIG. 30 is a diagram illustrating wrap-around slices according to an embodiment of the disclosure. FIG. 31 is a table showing an order of the tiles included in the wrap-around slices of FIG. 30.

A picture 3000 may include a plurality of wrap-around slices. The picture 3000 may include a total of 4 slices. In other words, slice 0, slice 1, and slice 2 are wrap-around slices, and slice 3 is a general slice.

The video decoding apparatus 1700 according to an embodiment may determine respective identification numbers of the tiles included in each slice and a decoding order, based on the respective identification numbers of a first tile and a last tile of each slice obtained from the bitstream.

For example, the video encoding apparatus 1900 according to an embodiment may signal information about the respective identification numbers of the first tiles of the slices 0, 1, 2, and 3 and information about the respective identification numbers of the last tiles of the slices 0, 1, 2, and 3.

The video decoding apparatus 1700 according to an embodiment may obtain the information about the identification number of the first tile of slice 0 and the information about the identification number of the last tile of slice 0 from the bitstream, and may determine that the identification number of the first tile is 22 and the identification number of the last tile is 1. Because the identification number of the first tile is greater than the identification number of the last tile and a number 4 of a tile column of the first tile is greater than a number 1 of a tile column of the last tile, the video decoding apparatus 1700 according to an embodiment may determine that slice 0 is a wrap-around slice in which an upper boundary and a lower boundary of the picture 300 are connected to each other and a left boundary and a right boundary of the picture 3000 are connected to each other, namely, four edges of the picture 3000 are connected to one another. In addition, the video decoding apparatus 1700 may decode the tile 22, the tile 23, the tile 18, the tile 19, the tile 4, the tile 5, the tile 0, and the tile 1 in this stated order according to the wrap-around order.

The video decoding apparatus 1700 according to an embodiment may obtain the information about the identification number of the first tile of slice 1 and the information about the identification number of the last tile of slice 1 from the bitstream, and may determine that the identification number of the first tile is 20 and the identification number of the last tile is 3. Because the identification number of the first tile of slice 1 is greater than the identification number of the last tile of slice 1 and a number 2 of a tile column of the first tile is not greater than a number 3 of a tile column of the last tile, the video decoding apparatus 1700 according to an embodiment may determine that slice 1 is a wrap-around slice in which an upper boundary and a lower boundary of the picture 300 are connected to each other. In addition, the video decoding apparatus 1700 may decode the tile 20, the tile 21, the tile 2, and the tile 3 in this stated order according to the wrap-around order.

The video decoding apparatus 1700 according to an embodiment may obtain the information about the identification number of the first tile of slice 2 and the information about the identification number of the last tile of slice 2 from the bitstream, and may determine that the identification number of the first tile is 10 and the identification number of the last tile is 13. Because the identification number of the first tile of slice 2 is not greater than the identification number of the last tile of slice 2 and a number 4 of a tile column of the first tile is greater than a number 1 of a tile column of the last tile, the video decoding apparatus 1700 according to an embodiment may determine that slice 2 is a wrap-around slice in which a left boundary and a right boundary of the picture 300 are connected to each other. In addition, the video decoding apparatus 1700 may decode the tile 10, the tile 11, the tile 6, the tile 7, the tile 16, the tile 17, the tile 12, and the tile 13 in this stated order according to the wrap-around order.

The video decoding apparatus 1700 according to an embodiment may obtain the information about the identification number of the first tile of slice 3 and the information about the identification number of the last tile of slice 3 from the bitstream, and may determine that the identification number of the first tile is 8 and the identification number of the last tile is 15. Because the identification number of the first tile of slice 3 is not greater than the identification number of the last tile of slice 3 and a number 2 of a tile column of the first tile is not greater than a number 3 of a tile column of the last tile, the video decoding apparatus 1700 according to an embodiment may determine that slice 3 is a general slice rather than a wrap-around slice. In addition, the video decoding apparatus 1700 may decode the tile 8, the tile 9, the tile 14, and the tile 15 in this stated order according to the wrap-around order.

A method, performed by the video encoding apparatus 1900, of performing video encoding on the tiles of a picture will now be described with reference to FIG. 20.

Figure 20:
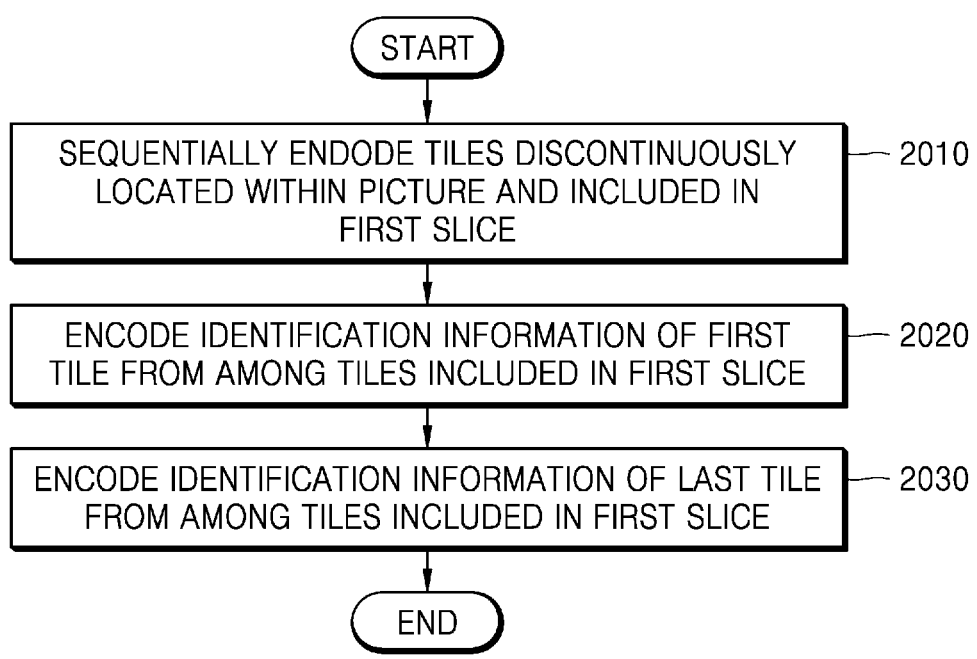
FIG. 20 is a flowchart of a video encoding method according to an embodiment.

FIG. 20 is a flowchart of a video encoding method according to an embodiment of the disclosure.

In operation 2010, when the tiles included in a first slice are discontinuously located within the picture, the encoder 1910 may encode the tiles included in the first slice according to an order.

In operation 2020, the syntax element generator 1920 may encode identification information of a first tile located at an upper left end from among the tiles included in the first slice.

In operation 2030, the syntax element generator 1920 may encode identification information of a last tile located at a lower right end from among the tiles included in the first slice.

The encoder 1910 may split the picture into one or more tile rows and split the picture into one or more tile columns. Each tile may be a rectangular area including one or more largest coding units into which pictures are split. Each tile may be included in one or more tile rows and may be included in one or more tile columns.

The encoder 1910 may determine a width and a height of each tile to be fixed sizes. In this case, the syntax element generator 1920 may encode information about the width of a tile column and information about the height of a tile row from among the tiles into which the picture is split.

In the video encoding apparatus 1900 according to an embodiment, there may be a motion constraint in which motion referencing is possible only in a temporally corresponding type group. When a reference picture index of a first picture indicates a second picture and a location corresponding to a first tile included in the first picture is a second tile of the second picture, the encoder 1910 may perform motion estimation so that a reference block of a current block included in the first tile is searched for from the second tile. Thus, the motion vector of the current block may indicate only a block in the second tile.

The video encoding apparatus 1900 according to an embodiment may encode information about a current tile or a current tile group in a tile group header or a tile header.

When a motion constraint is applied to the current tile, a block belonging to the current tile may refer to only an internal area of a tile at the same location as the current tile in a reference image, or may refer to only an internal area of a tile having the same tile index as the current tile even when the tile is not at the same location as the current tile. The encoder 1910 may additionally signal the index of a tile to which the current tile is to refer, and the block of the current tile may refer to only the internal area of the tile corresponding to the tile index. In this case, information about a current tile group may be encoded to represent that a motion constraint is applied to the current tile.

Similarly, when the information about the current tile group indicates that a motion constraint is applied to the current tile group, a block belonging to the current tile group may refer to only an internal area of a tile group at the same location as the current tile group in the reference image or may refer to only an internal area of a tile group having the same tile group index as the current tile group even when the tile is not at the same location as the current tile group. The encoder 1910 may additionally signal the index of a tile group to which the current tile group is to refer, and the block of the current tile may refer to only the internal area of the tile corresponding to the tile group index. Each tile group may be a sub-picture of a picture. The information about the current tile group may be encoded to represent that a motion constraint is applied to the current tile.

When the information about the current tile group indicates that a motion constraint is not applied to the current tile, a reference picture of the current block included in the current tile group may be determined to be a picture unit rather than a sub-picture unit. Accordingly, the index of a current sub-picture belonging to the current tile group may correspond to a location of a sub-picture within a current picture, and the index of a reference sub-picture including a reference block indicated by the motion vector of a current block may correspond to a location of a sub-picture within a reference picture of the current block. Even when the index of the current sub-picture is different from the index of the reference sub-picture, because the reference block belongs to the reference picture of the current block, the reference block may be used for motion prediction of the current block. In this case, the video encoding apparatus 1900 may encode the information about the current tile group so that the information about the current tile group indicates that a motion constraint is not applied to the current tile.

Such a motion constraint between tiles may extend to a tile group.

According to an embodiment, a first tile group may include a plurality of tiles adjacent to one another from among tiles into which a first picture is split, and a second tile group may include tiles corresponding to locations of the tiles included in the first tile group from among a second picture. The first tile group may be a first slice including a first tile, and the second tile group may be a second slice including a second tile.

When a reference picture of a first block included in the tiles included in the first tile group is the first picture, the video encoding apparatus 1900 may determine the reference block of the first block to be within the second tile group. Accordingly, the motion vector of the first block within the first tile group may be allowed to indicate only a block included in the tiles included in the second tile group. In other words, the video encoding apparatus 1900 may not allow the reference block of the first block included in the first tile to be a block of the second picture located outside the second tile group.

On the other hand, when there are no motion constraints allowing the motion vector of the first block to indicate a block included in the tiles included in the second tile group, the video encoding apparatus 1900 may allow the motion vector of the first block to indicate a block of the second picture even when the block of the second picture is located outside the second tile group, because the block is a block of the second picture.

In addition, the video encoding apparatus 1900 may selectively determine a reference tile group that the first tile group may refer to. For example, when the reference picture is split into a plurality of tile groups, information for selecting one of the plurality of tile groups as a reference group of the first tile group may be set, and a reference block of the current block may be determined within the selected tile group.

As another example, a reference block of the current block may be allowed to be determined within a plurality of tile groups including from a tile group present at a location corresponding to a tile group including the current block within the reference picture to a selectively added tile group.

An embodiment in which various parameters are defined in a tile header or a tile group header will be described later in detail.

According to an embodiment, whether the current tile is a motion constraint tile may be signaled to the tile group header or the tile header. When the current tile is a motion constraint tile, the current tile may refer to only an internal area of a tile at the same location as the current tile in a reference image, or may refer to only an internal area of a tile having the same tile index as the current tile even when the tile is not at the same location as the current tile. The index of a tile to which the current tile is to refer may be additionally signaled, and the current tile may refer to only the internal area of the tile corresponding to the tile index.

According to an embodiment, there may be two methods of organizing the tiles within a picture into a tile group. Identification numbers of two tile groups may be allocated to each tile, or two mapping relationships for organizing the tiles within a picture into a tile group may be allocated. At this time, one tile group may not refer to other tile groups such that the tile groups may be independently decoded. Other tile group information constitutes a bitstream, a NAL unit is formed in units of tile groups, and the bitstream may be decoded. Thus, the video decoding apparatus 1700 decodes the bitstream in an order of the tiles configured through second tile group information. However, a determination as to whether the current tile is predictable with a neighboring tile may be made according to first tile group information.

The video encoding apparatus 1900 according to an embodiment may configure a bitstream with pieces of information generated by grouping the tiles included in a slice that is to be reconstructed by the video decoding apparatus 1700 and encoding the grouped tiles. For example, the video encoding apparatus 1900 including a plurality of video codec processors may encode the tiles in parallel, and may configure a bitstream by grouping the tiles belonging to each parallel-processing slice.

The video encoding apparatus 1900 may encode information about the tiles that constitute the bitstream. In detail, as in the embodiment of FIG. 23, the video encoding apparatus 1900 may encode not only decoding slice map information including information about the tiles belonging to the ROI slice 2310 but also encoding slice map information including information about the tiles belonging to the parallel processing slices.

As another example, instead that the decoding slice map information and the encoding slice map information are signaled, the video encoding apparatus 1900 may generate information about a predictable tile and include the generated information in a tile header or a slice header when decoding the current tile. For example, the encoder 1910 may determine an available tile representing one or more referenceable neighboring tiles, such as a left tile, an upper tile, an upper left tile, and an upper right tile. The syntax element generator 1920 may generate encoding information of the current tile, by using encoding information of the available tile, such as a reconstructed image sample, an encoding mode, a motion vector, or a coefficient value. The syntax element generator 1920 may also generate identification information indicating the available tile from among tiles spatially adjacent to each tile, and may include the generated identification information in the tile header or the slice header.

The video encoding apparatus 1900 according to an embodiment may determine a reference picture list for each of the plurality of tiles. The encoder 1910 may encode the current tile from among the plurality of tiles by referring to a tile at a certain location allocated to the current tile from a first reference picture included in a reference picture list of the current tile. A detailed description of the reference picture list of each tile will be given later with reference to FIGS. 26 and 27.

As another example, when the second slice is a slice at an arbitrary location, the syntax element generator 1920 may generate identification numbers of tiles present at the arbitrary location included in the second slice, and may generate arbitrary location information of the second slice indicating whether the second slice is the slice at the arbitrary location. A detailed description of the slice at the arbitrary location will be given later with reference to FIG. 38.

When the second slice is the slice at the arbitrary location, the syntax element generator 1920 may generate information indicating the number of remaining slices except for the first tile in the second slice. The syntax element generator 1920 may generate information indicating an identification information difference between the current tile and a tile of just previous identification information for each of the tiles included in the second slice.

Various embodiments of the reference picture list of each tile will now be described in detail with reference to FIGS. 26 and 27.

Figure 26:
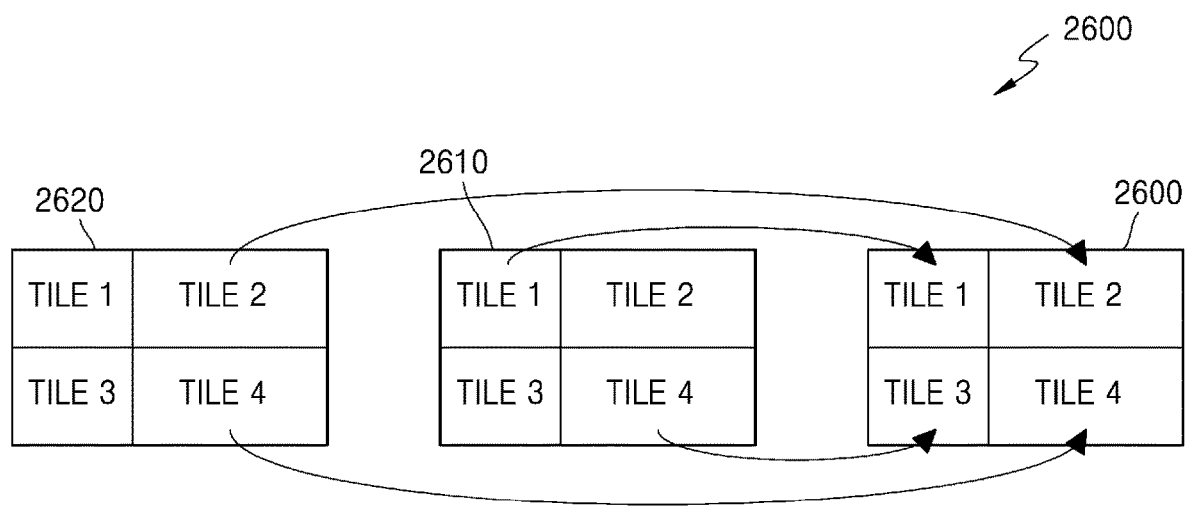
FIG. 26 is a diagram illustrating a reference picture list of a tile, according to an embodiment.

FIG. 26 is a diagram illustrating a reference picture list of a tile, according to an embodiment of the disclosure.

The video decoding apparatus 1700 according to an embodiment may determine a reference picture list for each tile or slice included in a picture. For example, when a single reference picture is used for each tile, tile 1 of a current picture 2600 may refer to tile 1 of a reference picture 2610, and tile 3 of the current picture 2600 may refer to tile 3 of the reference picture 2610. Tile 2 of the current picture 2600 may refer to tile 2 of a reference picture 2620, and tile 4 of the current picture 2600 may refer to tile 4 of the reference picture 2620. Reference pictures may be independently determined for each tile, but may be used for prediction of a current tile by using a reference tile corresponding to the same location as the location of the current tile in a current picture from among the reference pictures.

The video decoding apparatus 1700 according to an embodiment may update the tiles of the reference pictures stored in a decoded picture buffer (DPB) for each tile.

Figure 27:
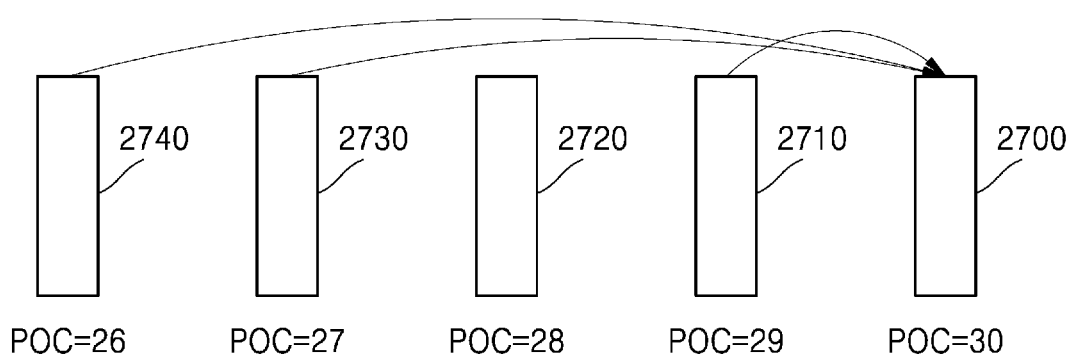
FIG. 27 is a diagram illustrating a method of transmitting a reference picture list of a tile, according to an embodiment.

FIG. 27 is a diagram illustrating a method of transmitting a reference picture list of a tile, according to an embodiment of the disclosure.

The video decoding apparatus 1700 according to an embodiment may transmit a difference between a picture order count (POC) of a current image and a POC of a previous image recorded on a reference picture list, in order to transmit the reference picture list.

For example, respective POCs of a current picture 2700 and reference pictures 2710, 2720, 2730, and 2740 are 30, 29, 28, 27, and 26, respectively.

The reference pictures 2720, 2730, and 2740 respectively having POCs of 28, 27, and 26 are sequentially included in the reference picture list of the current picture 2700.

To transmit information for identifying the reference pictures included in the reference picture list, POC difference values between the current picture 2700 and the reference pictures 2720, 2730, and 2740 may be sent, instead that all of the POCs of the reference pictures are sent.

For example, the video encoding apparatus 1900 may transmit difference values of −1, −3, and −4 between the POC of 30 of the current picture 2700 and the POCs of 29, 27, and 26 of the reference pictures 2710, 2730, and 2740.

As another example, the video encoding apparatus 1900 according to an embodiment may transmit a difference value between the reference pictures included in the reference picture list. In detail, the video encoding apparatus 1900 according to an embodiment may transmit the POC difference value of −1 between the POC of 30 of the current picture 2700 and the POC of 29 of the reference picture 2710, the POC difference value of −2 between the POC of 29 of the reference picture 2710 and the POC of 27 of the reference picture 2730, and the POC difference value of −1 between the POC of 27 of the reference picture 2730 and the POC of 26 of the reference picture 2740. The video decoding apparatus 1700 according to an embodiment may receive {−1, −2, −1} as reference picture list information of the current picture 2700 having the POC of 30. Because {−1, −2, −1} represents the POC difference value between the current picture 2700 and the first reference picture, the POC difference value between the first reference picture and the second reference picture, and the POC difference value between the second reference picture and the third reference picture, the video decoding apparatus 1700 may reconstruct a reference picture list {29, 27, 26} from the POC of 30 of the current picture 2700. In other words, the reference pictures 2710, 2730, and 2740 may be included in this stated order in the reference picture list of the current picture 2700.

The reference pictures may be included in an increasing or decreasing order of a POC, in the reference picture list.

When a short-term reference picture and a long-term reference picture are both included in the reference picture list, a POC difference value may be transmitted for only the short-term reference picture.

Figure 32:
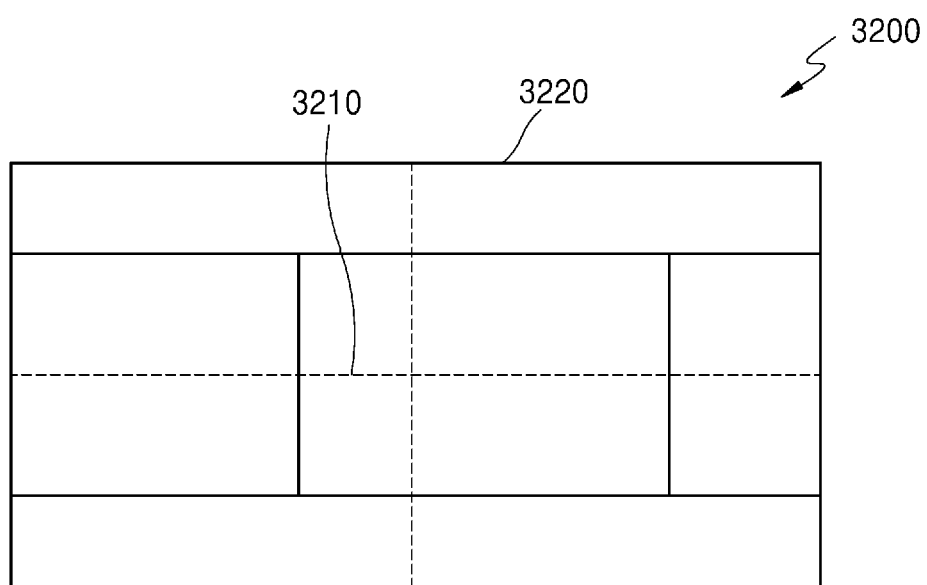
FIG. 32 illustrates an embodiment in which a slice for parallel processing and a slice according to an ROI are inconsistent with each other within a picture.
Figure 33:
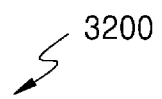
FIG. 33 illustrates tiles for configuring slices shown in FIG. 32.

Various layouts of the tiles for each slice when a slice for parallel processing is inconsistent with an ROI slice will now be proposed with reference to FIGS. 32, 33, and FIG. 32 illustrates an embodiment in which a slice for parallel processing and a slice according to an ROI are inconsistent with each other within a picture. FIG. 33 illustrates tiles for configuring slices shown in FIG. 32. FIG. 34 illustrates a layout of the tiles for each slice of FIG. 33.

The video encoding apparatus 1900 according to an embodiment may split a picture 3200 into parallel processing slices 3210 marked by dashed lines, and may encode the parallel processing slices 3210 in parallel. However, an ROI area of the picture 3200 may be ROI slices 3220 marked by solid lines.

When the parallel processing slices 3210 are inconsistent with the ROI slices 3220, the lines of boundaries of the parallel processing slices 3210 and the ROI slices 3220 are extended such that the picture 3200 may be split into tiles as shown in FIG. 33.

According to a layout A for ROI slices in FIG. 34, the video decoding apparatus 1700 may decode tiles in an order of tile 0, tile 1, tile 2, and tile 3 in order to reconstruct slice 0, and may decode tiles in an order of tile 4 and tile 8 in order to reconstruct slice 1. According to the layout A for ROI slices in FIG. 34, the video decoding apparatus 1700 may decode tiles in an order of tile 5, tile 6, tile 9, and tile 10 in order to reconstruct slice 2, may decode tiles in an order of tile 7 and tile 11 in order to reconstruct slice 3, and may decode tiles in an order of tile 12, tile 13, tile 14, and tile 15 in order to reconstruct slice 4.

According to a layout B for parallel processing slices in FIG. 34, the video encoding apparatus 1900 may encode tiles in an order of tile 0, tile 1, tile 4, and tile 5 in order to encode slice 0, may encode tiles in an order of tile 2, tile 3, tile 6, and tile 7 in order to encode slice 1, may encode tiles in an order of tile 8, tile 9, tile 12, and tile 13 in order to encode slice 2, and may encode tiles in an order of tile 10, tile 11, tile 14, and tile 15 in order to encode slice 3.

A tile group header and a tile group data syntax included in a bitstream received by the video decoding apparatus 1700, and equations for determining the number of tiles included in a tile group will now be described with reference to FIGS. 35 through 37.

Figure 35:
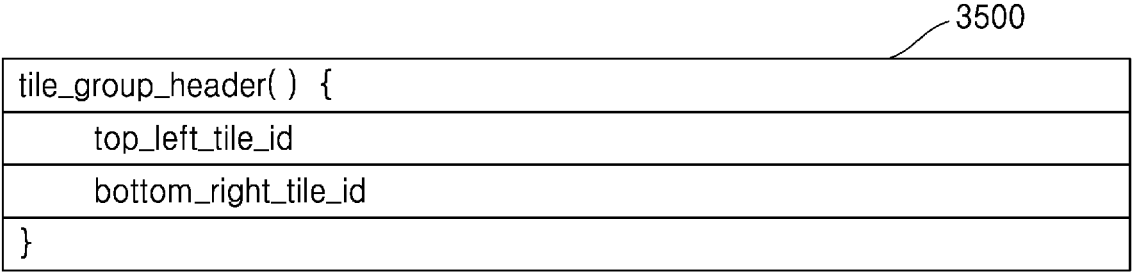
FIG. 35 illustrates the syntax of a tile group header for a tile group, according to an embodiment.

FIG. 35 illustrates the syntax of a tile group header for a tile group, according to an embodiment of the disclosure.

The video decoding apparatus 1700 according to an embodiment may obtain identification information top_left_tile_id of a first tile and identification information bottom_right_tile_id of a last tile from among tiles included in a current tile group from a tile group header 3500. Identification information, which is a number increasing or decreasing according to a raster scan order, may be a number according to a raster scan order of a current tile from among the tiles included in a picture.

The identification information top_left_tile_id of the first tile may have a bit length of Ceil (Log 2 (NumTilesInPic)). Ceil(Log 2 (NumTilesInPic) is rounded up from a first decimal place of Log 2 (NumTilesInPic) to output an integer value. Thus, the bit length of the identification information top_left_tile_id of the first tile may be an integer value determined through rounding up from a first decimal place of the log value of NumTilesInPic, which is the number of tiles included in a current picture. The value of the identification information top_left_tile_id of the first tile may not be consistent with the identification information of a first tile of another tile group included in the current picture.

The bit length of the identification information bottom_right_tile_id of the last tile is Ceil(Log 2(NumTilesInPic)), and may be an integer value determined through rounding up from the first decimal place of the log value of NumTilesInPic, which is the number of tiles included in the current picture. When the identification information bottom_right_tile_id of the last tile is not obtained, the video decoding apparatus 1700 may determine that the identification information of the last tile has the same value as that of the first tile.

FIG. 36 illustrates the syntax of tile group data for a tile group, according to an embodiment of the disclosure. FIG. 37 illustrates a process of obtaining the number of tiles included in a tile group, according to an embodiment of the disclosure.

The video decoding apparatus 1700 according to an embodiment may determine indexes of the tiles included in a tile group from a tile group data syntax 3600. The index of a first tile may be defined as the identification information of the first tile, and the index of a next tile may be determined according to according to a raster scan order.

When an index CurrTileIdx of a current tile is determined, an address ctbAddrinTs of a first largest coding unit from among the largest coding units included in the current tile may be obtained using the index of the current tile. (ctbAddrinTs=FirstCtbAddrTs [CurrTileIdx]) The video decoding apparatus 1700 may decode the largest coding units included in the current tile by calling starting from a coding tree unit syntax coding_tree_unit( ) for the first largest coding unit.

The number NumTileColumnsInTileGroup of tile columns included in a current tile group and the number NumTileRowsInTileGroup of tile rows included therein are needed in a process of determining the index of the current tile in the tile group data syntax 3600. To this end, an index difference deltaIdx between the index of a first tile and the index of a last tile needs to be determined according to the aforementioned relational expressions in FIG. 37.

In expression 3710, when the identification information of the first tile is greater than the identification information of the last tile, the video decoding apparatus 1700 may determine, as the index difference deltaIdx between the first tile and the last tile, a value determined by adding the number of tiles included in a picture to a value determined by subtracting the identification information of the first tile from the identification information of the last tile. In expression 3710, a current slice may be a wrap-around slice in which an upper boundary and a lower boundary of the picture are connected to each other as in slice 1 of FIG. 30.

In expression 3730, the column number of the first tile may be determined to be top_left_tile_id % (num_tile_columns_minus1+1). The column number of the last tile may be determined to be bottom_right_tile_id % (num_tile_columns_minus1+1). When the identification information of the first tile is not greater than the identification information of the last tile and the column number of the first tile is less than or equal to that of the last tile, the video decoding apparatus 1700 may determine, as the index difference deltaIdx between the first tile and the last tile, a value determined by subtracting the identification information of the first tile from the identification information of the last tile. In expression 3730, the current slice may be a general slice rather than a wrap-around slice, as in slice 4 of FIG. 30.

When the identification information of the first tile is not greater than the identification information of the last tile and the column number of the first tile is not greater than that of the last tile, the video decoding apparatus 1700 may determine, as the index difference deltaIdx between the first tile and the last tile, a value determined by adding the number num_tile_columns_minus1 of tile columns included in the picture to a value determined by subtracting the identification information of the first tile from the identification information of the last tile. In expression 3720, the current slice may be a wrap-around slice in which a left boundary and a right boundary of the picture are connected to each other as in slice 2 of FIG. 30.

In expression 3740, the video decoding apparatus 1700 may determine the number NumTileRowsInTileGroup of tile rows included in the current tile group, based on a quotient (/) determined by dividing the index difference deltaIdx between the first tile and the last tile by the number of tile columns included in the picture.

In expression 3750, the video decoding apparatus 1700 may determine the number NumTileColumnsInTileGroup of tile rows included in the current tile group, based on a remainder (%) determined by dividing the index difference deltaIdx between the first tile and the last tile by the number of tile columns included in the picture.

In expression 3760, the video decoding apparatus 1700 may determine, as the number NumTilesInTileGroup of tiles included in the current tile group, a value determined by multiplying the number NumTileRowsInTileGroup of tile rows included in the current tile group by the number NumTileColumnsInTileGroup of tile columns included in the current tile group.

In FIGS. 35 through 37, a tile group is the same concept as a slice, and accordingly may be replaced with a slice. The tile group header, the tile group data syntax, and the number of tiles included in a tile group may be replaced by a slice header, a slice data syntax, and the number of tiles included in a slice, respectively.

The video encoding apparatus 1900 and the video decoding apparatus 1700 according to an embodiment may determine whether a first tile of a current slice is a general slice or a wrap-around slice, by comparing the size of the identification information of the first tile with that of the identification information of a last tile and comparing the column number of the first tile with the column number of the last tile. Accordingly, only transmission of the identification information of a first tile and the identification information of a last tile may enable determination of the identification information of each of the tiles included in a slice no matter what shape the slice has, and thus the number of bits used to represent the identification information of a tile may be reduced.

The video encoding apparatus 1900 according to an embodiment may signal information about a slice (tile group) including a plurality of tiles present at an arbitrary location regardless of whether they are adjacent to each other within a picture, or a tile including largest coding units present at an arbitrary location. The video decoding apparatus 1700 may obtain information about an arbitrary location slice (tile group) from a bitstream and may reconstruct the arbitrary location slice by decoding tiles present at an arbitrary location. An embodiment of realizing an arbitrary location slice will now be described in detail with reference to FIGS. 38 through 40.

Figure 38:
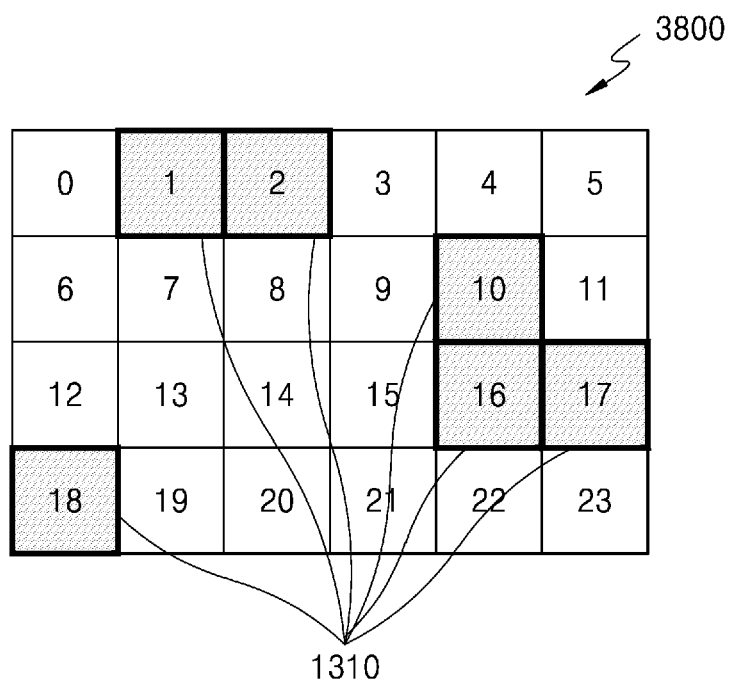
FIG. 38 illustrates a tile group of an arbitrary location, according to an embodiment.

FIG. 38 illustrates a tile group of an arbitrary location, according to an embodiment of the disclosure.

A picture 3800 includes tiles 0 through 23. The video encoding apparatus 1900 may encode a slice 3810 including tile 1, tile 2, tile 10, tile 16, tile 17, and tile 18. The video encoding apparatus 1900 may generate a bitstream by encoding information representing the tiles included in the slice 3810, and the video decoding apparatus 1700 may obtain the information representing the tiles included in the slice 3810 from the bitstream and decode each of the tiles.

The video encoding apparatus 1900 may encode the tiles in an order of the tile 1, the tile 2, the tile 10, the tile 16, the tile 17, and the tile 18 according to a raster scan order. The video decoding apparatus 1700 may encode the tiles according to a raster scan order.

The video encoding apparatus 1900 may signal the information representing the tiles included in the slice 3810, by encoding a difference value between the indexes of the tiles by using pieces of identification information or indexes of the tiles included in a slice. For example, the information representing the remaining tiles except for tile 1, which is a first tile, from among the tiles included in the slice 3810 may signal index differences between the remaining tiles and a previous tile. Accordingly, the video encoding apparatus 1900 may encode 1, +1(=2−1), +8(=10−2), +6(=16−10), +1(=17−16), and +1(=18−17) as the pieces of identification information of the tiles included in the slice 3810.

The video decoding apparatus 1700 may obtain the difference values between the indexes of the tiles included in the slice 3810 from the bitstream, and thus may determine the locations of the tiles included in the slice 3810 and decode the tiles. Thus, when the pieces of identification information of the tiles included in the slice 3810, which are obtained from the bitstream, are 1, +1(=2−1), +8(=10−2), +6(=16−10), +1(=17−16), and +1(=18−17), the pieces of identification information of the tiles may be determined to be 1, 2(=1+1), 10(=2+8), 16(=10+6), 17(=16+1), and 18(=17+1). Accordingly, the video decoding apparatus 1700 may reconstruct the slice 3810 by decoding the tile 1, the tile 2, the tile 10, the tile 16, the tile 17, and the tile 18.

FIG. 39 illustrates the syntaxes of a tile group header and tile group data for a tile group, according to an embodiment of the disclosure. FIG. 40 illustrates a process of obtaining the number of tiles included in a tile group, and respective identification numbers of the tiles, according to an embodiment of the disclosure.

Information about the locations of the tiles included in the tile group may be signaled through a tile group header syntax 3900 and a tile group data syntax 3910 of FIG. 39.

The video encoding apparatus 1700 according to an embodiment may include not only the identification information top_left_tile_id of the first tile but also information num_remained_tiles_in_tile_group_minus1 representing the number of tiles remaining in the tile group in the tile group header syntax 3900, as shown in FIG. 35. The video encoding apparatus 1700 according to an embodiment may also include information delta_tile_id_minus1 representing an index difference between the current tile and the previous tile in the tile group header syntax 3900.

A bit length of the information num_remained_tiles_in_tile_group_minus1 representing the number of tiles remaining in the tile group is Ceil(Log 2(NumTilesInPic−1)), and may be an integer value determined through rounding up from the first decimal place of the log value of NumTilesInPic, which is the number of tiles included in the current picture.

The bit length of the information delta_tile_id_minus1 representing an index difference between the current tile and the previous tile may not be consistent with the identification information of a tile of another tile group included in the current picture.

The video decoding apparatus 1700 according to an embodiment may obtain the information delta_tile_id_minus1 representing an index difference between the current tile and the previous tile by obtaining the information num_remained_tiles_in_tile_group_minus1 representing the number of tiles remaining in the tile group from the tile group header 3900.

According to expression 4010, the video decoding apparatus 1700 may determine the number NumTilesInTileGroup of tiles included in the current tile group by using the information num_remained_tiles_in_tile_group_minus1 representing the number of tiles remaining in the tile group.

According to expression 4020, the video decoding apparatus 1700 may determine identification information tileId of the current tile by using the information delta_tile_id_minus1 representing an index difference between the current tile and the previous tile and the identification information top_left_tile_id of the first tile, for each tile included in the tile group.

The video decoding apparatus 1700 may decode the largest coding units included in each tile by calling a coding tree unit syntax for each time included in the current tile group, by using the number NumTilesInTileGroup of tiles included in the current tile group and the identification information tileId of the current tile.

In FIGS. 39 and 40, a tile group is the same concept as a slice, and accordingly the tile group header, the tile group data syntax, and the number of tiles remaining in a tile group may be replaced by a slice header, a slice data syntax, and the number of tiles remaining in a slice, respectively.

The video encoding apparatus 1900 and the video decoding apparatus 1700 according to an embodiment transmit an index difference value between the current tile and the previous tile as the identification information of each tile included in a slice even when the slice is a slice (tile group) at an arbitrary location, thereby reducing the number of bits used to represent the identification information of each tile.

Meanwhile, the embodiments of the disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. The machine-readable storage medium may be provided as a non-transitory storage medium. Here, the 'non-transitory storage medium' is a tangible device and means that the storage medium does not include a signal (for example, an electromagnetic wave), but this term does not distinguish whether data is stored semi-permanently or temporarily in the storage medium. For example, the 'non-transitory storage medium' may include a buffer that temporarily stores data.

Other examples of the medium include recording media and storage media managed by application stores distributing applications or by websites, servers, and the like supplying or distributing other various types of software.

According to an embodiment, methods according to the various disclosed embodiments of the disclosure may be provided by being included in a computer program product. The computer program product may be traded as a commodity between a seller and a purchaser. The computer program product may be distributed in the form of a machine-readable storage medium (e.g., compact disc read only memory (CD-ROM)), or be distributed online (e.g., download or upload) via an application store (e.g., Play Store™) or directly between two user devices (e.g., smartphones). When distributed online, at least part of the computer program product (e.g., a downloadable app) may be temporarily generated or at least temporarily stored in a machine-readable storage medium, such as a memory of a manufacturer's server, a server of the application store, or a relay server.

While one or more embodiments of the disclosure have been described with reference to the figures, it will be understood by those of ordinary skill in the art that various changes in form and details may be made therein without departing from the spirit and scope as defined by the following claims.

The invention claimed is:

1. A video decoding method comprising:
obtaining information about an index of a first tile and information about an index of a last tile from a bitstream, wherein the first tile and the last tile are included in a first slice;
obtaining a column index of the first tile using the information about the index of the first tile;
obtaining a column index of the last tile using the information about the index of the last tile;
determining an index difference between the first tile and the last tile, based on whether the index of the first tile is greater than the index of the last tile and whether the column index of the first tile is greater than the column index of the last tile;
determining a number of tiles included in the first slice using the index difference between the first tile and the last tile and a number of tile columns included in a picture; and
decoding a plurality of tiles included in the first slice using the number of tiles included in the first slice.

2. A video decoding apparatus comprising:
a syntax element obtainer configured to obtain information about an index of a first tile and information about an index of a last tile from a bitstream, wherein the first tile and the last tile are included in a first slice; and
a decoder configured to obtain a column index of the first tile using the information about the index of the first tile, obtain a column index of the last tile using the information about the index of the last tile, determine an index difference between the first tile and the last tile, based on whether the index of the first tile is greater than the index of the last tile and whether the column index of the first tile is greater than the column index of the last tile, determine a number of tiles included in the first slice the index difference between the first tile and the last tile and a number of tile columns included in a picture, and decode a plurality of tiles included in the first slice using the number of tiles included in the first slice.

3. A video encoding method comprising:
when tiles included in a first slice are discontinuously located within a picture, sequentially encoding the tiles included in the first slice;
encoding information about an index of a first tile located at an upper left end from among the tiles included in the first slice; and
encoding information about an index of a last tile located at a lower right end from among the tiles included in the first slice,
wherein the information about the index of the first tile is used to obtain a column index of the first tile,
the information about the index of the last tile is used to obtain a column index of the last tile,
an index difference between the first tile and the last tile is obtained based on whether the index of the first tile is greater than the index of the last tile and whether the column index of the first tile is greater than the column index of the last tile,
a number of tiles included in the first slice is obtained using the index difference between the first tile and the last tile and a number of tile columns included in the picture.

* * * * *